United States Patent
Atef et al.

(10) Patent No.: US 9,118,760 B2
(45) Date of Patent: Aug. 25, 2015

(54) SYSTEMS AND METHODS FOR COORDINATED VOICE AND DATA COMMUNICATIONS

(75) Inventors: Farsheed Atef, Irvine, CA (US); Shervin Talieh, San Clemente, CA (US)

(73) Assignee: DRUMBI, INC., Lake Forest, CA (US)

( * ) Notice: Subject to any disclaimer, the term of this patent is extended or adjusted under 35 U.S.C. 154(b) by 0 days.

(21) Appl. No.: 13/606,805

(22) Filed: Sep. 7, 2012

(65) Prior Publication Data

US 2013/0195258 A1    Aug. 1, 2013

Related U.S. Application Data

(60) Provisional application No. 61/532,713, filed on Sep. 9, 2011, provisional application No. 61/589,820, filed on Jan. 23, 2012.

(51) Int. Cl.
| | |
|---|---|
| H04M 11/00 | (2006.01) |
| H04M 3/51 | (2006.01) |
| H04L 29/08 | (2006.01) |
| H04W 4/00 | (2009.01) |
| H04M 1/725 | (2006.01) |

(52) U.S. Cl.
CPC ............... *H04M 3/51* (2013.01); *H04L 67/34* (2013.01); *H04M 3/5191* (2013.01); *H04W 4/001* (2013.01); *H04M 1/72569* (2013.01); *H04M 2203/655* (2013.01)

(58) Field of Classification Search
CPC .......................... H04M 2201/40; H04M 1/271
USPC .............................................. 379/88.01, 88.18
See application file for complete search history.

(56) References Cited

U.S. PATENT DOCUMENTS

| | | | |
|---|---|---|---|
| 7,526,073 | B2 | 4/2009 | Romeo |
| 8,139,730 | B2 | 3/2012 | Da Palma et al. |
| 8,295,271 | B2 | 10/2012 | Radulovic |
| 8,306,044 | B2 | 11/2012 | Walter |
| 8,358,753 | B2 | 1/2013 | Deluca |
| 2006/0193448 | A1 | 8/2006 | Donoghue et al. |

(Continued)

FOREIGN PATENT DOCUMENTS

| | | |
|---|---|---|
| EP | 1772001 A1 | 4/2007 |
| EP | 2312820 A1 | 4/2011 |

OTHER PUBLICATIONS

PCT International Search Report and Written Opinion dated Apr. 30, 2013, from PCT/US2012/054292, 11 pages.

*Primary Examiner* — Simon King
(74) *Attorney, Agent, or Firm* — Knobbe, Martens, Olson & Bear LLP

(57) ABSTRACT

Systems and methods for processing calls and data are described. A user interface is displayed on a communication terminal associated with a user, wherein the user interface includes: a menu item enabling the user to initiate a voice call with a specified entity and a menu item or form via which the user can provide contextual information relating to the voice call. Contextual information provided by the user is transmitted to the specified entity, optionally prior to the voice call being established between the specified entity and the user. A data session is established. A call request is received from the user. Contextual information provided by the user is provided for display to the specified entity. A voice session is established, including the establishment of the voice call between the specified entity and the user, while the contextual information is displayed to the specified entity.

31 Claims, 59 Drawing Sheets

(56) References Cited

U.S. PATENT DOCUMENTS

| | | |
|---|---|---|
| 2009/0193038 A1 | 7/2009 | Butt |
| 2010/0034361 A1* | 2/2010 | Raghav et al. ............. 379/88.13 |
| 2010/0239081 A1 | 9/2010 | Krantz et al. |
| 2010/0279666 A1 | 11/2010 | Small et al. |

* cited by examiner

SYSTEMS AND METHODS FOR COORDINATED VOICE AND DATA COMMUNICATIONS

CROSS-REFERENCE TO RELATED APPLICATIONS

The present application claims priority from U.S. Patent Application No. 61/532,713, filed Sep. 9, 2011, and Patent Application No. 61/589,820, filed Jan. 23, 2012, the contents of which are incorporated herein by reference in their entirety.

BACKGROUND OF THE INVENTION

1. Field of the Invention

The present invention is related to communications, and in particular, to telephonic and data communications.

2. Description of the Related Art

Conventionally, when a service provider, such as an insurance company, receives a customer call, the service provider must manually input a large amount of information orally provided by the customer during the call into a computer system. This is a time consuming, expensive and error prone process.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. Various aspects and embodiments, or portions thereof, described herein may be combined to provide still other aspects and embodiments.

Certain embodiments described herein provide data enhanced voice calls via a communication system. Certain embodiments enable metadata or extended data (e.g., text, images, videos, and/or sound, that existed prior to the call) to be provided prior to, during and/or after a voice call to a called party, to thereby provide context for the voice call. For example, the contextual information can be related to a business service being provided by the called party to the caller (e.g., where one of the parties is a consumer and the other party is a business such as a service provider). By way of further example, the contextual information may be personal in nature (e.g., where the call is a person-to-person call, such as between friends or family members). The contextual data may be provided and/or presented via a mobile telecommunications device (e.g., a cell phone) application (e.g., an application specifically configured to receive contextual data/voice communications), a browser, or otherwise.

Certain embodiments further enable customized menus to be provided (e.g., via a dedicated application or a web page) to a user via a user communications device to facilitate efficient data and/or voice communications. In addition, certain embodiments predict queries from users and provide answers to such queries before the queries are submitted. Further, certain embodiments identify relationships between users based on information from the users and/or other sources, and facilitate communications between such related users. Additionally, certain embodiments facilitate synchronized many-to-many voice and data communication sessions. Certain embodiments of the communication system enable data relating to a context of a call to be shared parties other than the caller and called party (e.g., with business partners of the called party and/or with customers of the called party, where the called party is a business, such as a service provider). Certain embodiments authenticate a caller via a data communication prior to a voice call being established between the caller and the called party, where the called party is informed that the caller has been authenticated (e.g., just prior to the call being established and/or during the call). The authentication may be performed using an authentication technique previously specified by the called party.

An example aspect is a method of processing calls and data, the method comprising: providing an application to be downloaded to or installed on device, such as a wireless telephonic device associated with a user, the application configured to: provide a user interface for display on the wireless telephonic device, wherein the user interface includes at least one menu item enabling the user to initiate a voice call with a service provider; optionally at least one menu item or form via which the user can provide contextual information relating to information or actions to be provided or performed by the service provider; cause contextual information provided by the user to be transmitted to the service provider prior to a voice call being established between the service provider and the user in response to a user selection of the at least one menu item enabling the user to initiate the voice call with the service provider; receiving, from the application at a computer system, a call request from the user, wherein the call request is transmitted to the computer system in response to the user selection of the at least one menu item enabling the user to initiate the voice call with the service provider; receiving at the computer system contextual information provided by the user via the application and establishing a data session; identifying a service provider agent associated with the service provider to route the voice call to based at least in part on the contextual information; and after the transmission of the contextual information to the service provider, causing, at least in part, a voice session to be established, including the establishment of the voice call between the service provider agent and the user. Optionally, for a second user, a determination is made as whether or not to cause a second user interface, configured to enable the second user to provide context for a call between the second user and the specified entity, to be displayed to the second user based at least in part on historical contextual information for the second user An example aspect is a method of processing calls and data, the method comprising: providing a user interface for display on a communication terminal associated with a user, wherein the user interface includes: at least one menu item enabling the user to initiate a voice call with a specified entity; at least one menu item or form via which the user can provide contextual information relating to the voice call; enabling contextual information provided by the user via the user interface to be transmitted to the specified entity prior to the voice call being established between the specified entity and the user in response to a user selection of the at least one menu item enabling the user to initiate the voice call with the specified entity; receiving at a computer system, a call request from the user, wherein the call request is transmitted to the computer system in response to the user selection of the at least one menu item enabling the user to initiate the voice call with the specified entity; receiving at the computer system contextual information provided by the user via the user interface and establishing a data session; and after the transmission of the contextual information to the specified entity, causing, at least in part, a voice session to be established, including the establishment of the voice call between the specified entity and the user.

An example aspect is a call and data processing system, comprising: a computing system; non-transitory memory storing instructions that when executed by the computing system cause the computing system to perform operations comprising: providing a user interface for display on a communication terminal associated with a user, wherein the user interface includes: at least one menu item enabling the user to initiate a voice call with a specified entity; at least one menu item or form via which the user can provide contextual information relating to the voice call; enabling contextual information provided by the user via the user interface to be transmitted to the specified entity prior to the voice call being established between the specified entity and the user in response to a user selection of the at least one menu item enabling the user to initiate the voice call with the specified entity; receiving at a computer system, a call request from the user, wherein the call request is transmitted to the computer system in response to the user selection of the at least one menu item enabling the user to initiate the voice call with the specified entity; receiving at the computer system contextual information provided by the user via the user interface and establishing a data session; and after the transmission of the contextual information to the specified entity, causing, at least in part, a voice session to be established, including the establishment of the voice call between the specified entity and the user.

An example aspect is a method of processing calls and data, the method comprising: providing a user interface for display on a communication terminal associated with a user, wherein the user interface includes: at least one menu item enabling the user to initiate a voice call with a service provider; at least one menu item or form via which the user can provide contextual information relating to the voice call; enabling contextual information provided by the user via the user interface to be transmitted to the service provider prior to the voice call being established between the service provider and the user in response to a user selection of the at least one menu item enabling the user to initiate the voice call with the service provider; receiving at a computer system, a call request from the user, wherein the call request is transmitted to the computer system in response to the user selection of the at least one menu item enabling the user to initiate the voice call with the service provider; receiving at the computer system contextual information provided by the user via the user interface and establishing a data session; providing at least a portion of the contextual information to the specified entity; during or immediately after the call, providing a user interface which enables the user to submit a review related to the user's satisfaction related to the call; at least partly in response to receiving a review from the user, causing the review to be posted on a social networking page associated with the user and/or the service provider.

An example aspect is a method of processing calls and data, the method comprising: providing a user interface for display on a communication terminal associated with a user, wherein the user interface includes: at least one menu item enabling the user to initiate a voice call with a specified entity; at least one menu item or form via which the user can provide contextual information relating to the voice call; enabling contextual information provided by the user via the user interface to be transmitted to the specified entity prior to the voice call being established between the specified entity and the user in response to a user selection of the at least one menu item enabling the user to initiate the voice call with the specified entity; receiving at a computer system, a first call request from the user, wherein the first call request is transmitted to the computer system in response to the user selection of the at least one menu item enabling the user to initiate the voice call with the specified entity; receiving at the computer system contextual information provided by the user via the user interface and establishing a data session; after the transmission of the contextual information to the specified entity, causing, at least in part, a first voice session to be established, including the establishment of the voice call between the specified entity and the user; receiving a second call request from the user; causing at least in part a second voice session to be established; and causing the data session to be persisted during the second voice session.

An example aspect is a call and data processing system, comprising: a computing system; and non-transitory memory storing instructions that when executed by the computing system cause the computing system to perform operations comprising: providing a user interface for display on a communication terminal associated with a user, wherein the user interface includes: at least one menu item enabling the user to initiate a voice call with a specified entity; at least one menu item or form via which the user can provide contextual information relating to the voice call; enabling contextual information provided by the user via the user interface to be transmitted to the specified entity prior to the voice call being established between the specified entity and the user in response to a user selection of the at least one menu item enabling the user to initiate the voice call with the specified entity; receiving at a computer system, a first call request from the user, wherein the first call request is transmitted to the computer system in response to the user selection of the at least one menu item enabling the user to initiate the voice call with the specified entity; receiving at the computer system contextual information provided by the user via the user interface and establishing a data session; after the transmission of the contextual information to the specified entity, causing, at least in part, a first voice session to be established, including the establishment of the voice call between the specified entity and the user; receiving a second call request from the user; causing at least in part a second voice session to be established; causing the data session to be persisted during the second voice session.

BRIEF DESCRIPTION OF THE DRAWINGS

Embodiments of the present invention will now be described with reference to the drawings summarized below. These drawings and the associated description are provided to illustrate example embodiments, and not to limit the scope of the invention.

DETAILED DESCRIPTION OF PREFERRED EMBODIMENTS

Figure 1:
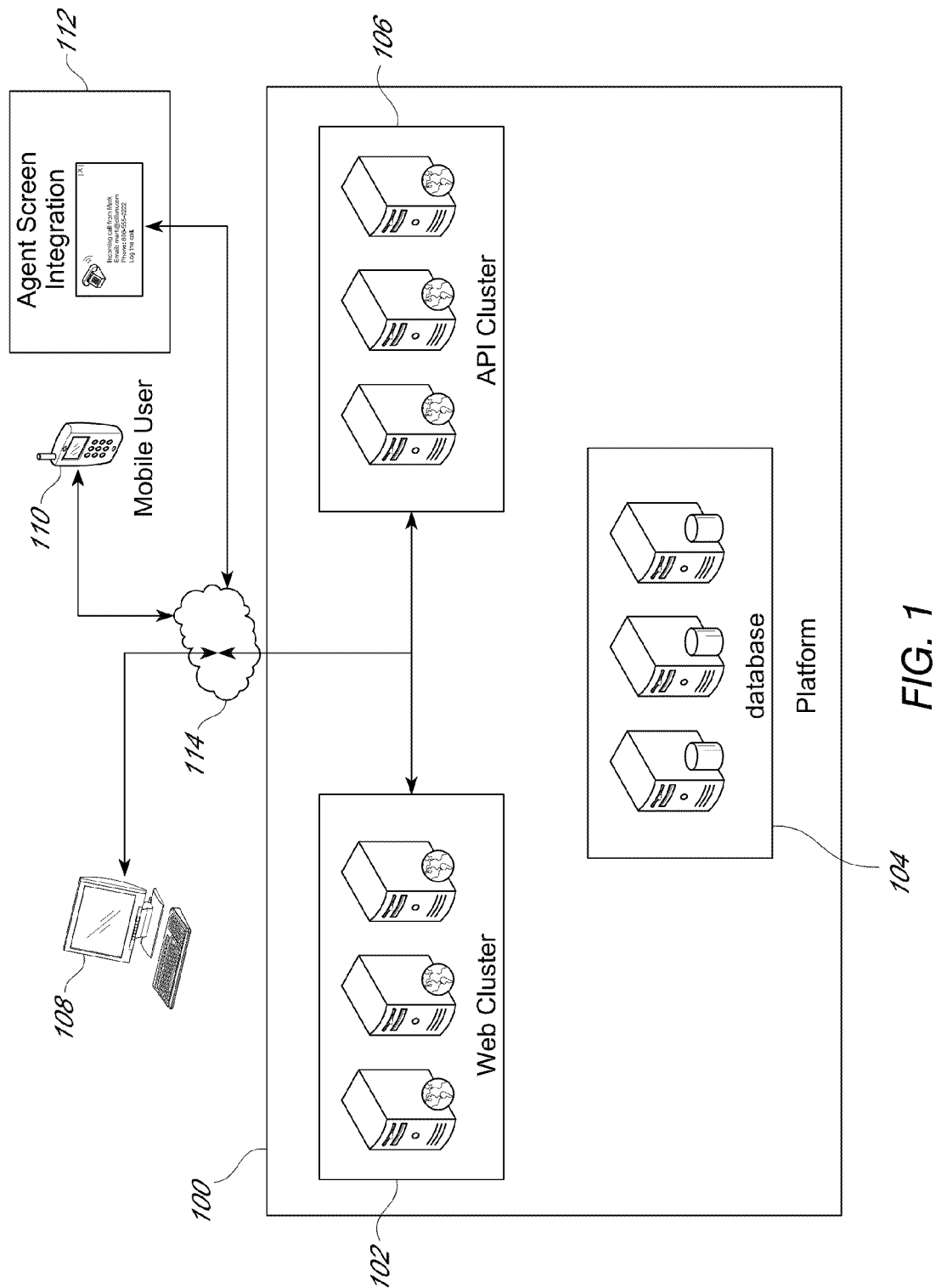
FIG. 1 illustrates a first example architecture.

Certain embodiments described herein provide data enhanced voice calls via a communication system. Certain embodiments enable metadata or extended data (e.g., text, images, videos, and/or sound, that existed prior to the call) to be provided prior to or during a voice call to a called party, to thereby provide context for the voice call. For example, the contextual information can be related to a business service being provided by the called party to the caller (e.g., where one of the parties is a consumer and the other party is a business) or the contextual information may be personal in nature (e.g., where the call is a person-to-person call, such as between friends or family members). The contextual data may be presented via mobile telecommunications device (e.g., a cell phone) application (e.g., an application specifically configured to receive contextual data/voice communications), a browser, or otherwise.

Certain embodiment further enable customized menus to be provided to a user via a user communications device to facilitate efficient data and/or voice communications. In addition, certain embodiments predict queries from users and provide answers to such queries before the queries are submitted. Further, certain embodiments identify relationships between users based on information from the users and/or other sources, and facilitate communications between such related users. Additionally, certain embodiments facilitate synchronized many-to-many voice and data communication sessions. Certain embodiments of the communication system enable data relating to a context of a call to be shared parties other than the caller and called party (e.g., with business partners of the called party and/or with customers of the called party, where the called party is a business, such as a service provider). Certain embodiments authenticate a caller via a data communication prior to a voice call being established between the caller and the called party, where the called party is informed that the caller has been authenticated (e.g., just prior to the call being established and/or during the call). The authentication may be performed using an authentication technique previously specified by the called party.

Unless otherwise indicated by the context, the term "caller" as used herein refers to an initiator of a communication which may potentially involve a voice call, even if a voice call does not actually take place or even if the call is in the form of a callback from a recipient of a call request. Similarly, the term "called party" as used herein refers to a recipient of a communication which may potentially involve a voice call, even if a voice call does not actually take place. For example, a user may intend to place a voice call requesting certain information, in conjunction with a data communication. However, a text response to the data communication may provide the user with the information the user wanted to request, thereby obviating the need for the voice call. Thus, using certain embodiments described herein, communications may be performed more efficiently, and the need for time consuming, and in certain situations, expensive voice calls (such as when a user is contacting a business regarding the status of a service being provided to the user) may be significantly reduced.

For example, certain embodiments enable a user to enter data into a form (e.g., via form fields, menu items, and/or controls) which will then be provided for display to a party called by the user prior to the called party answering the call, during the call, and/or after termination of the call. In addition, certain information may be automatically entered into the form presented to the called party. For example, the caller's location (e.g., as determined using a GPS, cell phone tower triangulation device, or other device included in the caller's terminal that receives information from which the caller's location can be determined), and/or data previously stored in the caller's profile may automatically be inserted into the form. Information entered by the caller may be stored in memory by a computer system associated with the called party. Thus, rather than the called party having to manually request information during the call, and then manually enter the information into a computer system (all of which can take a significant amount of time and may be error prone), the acquisition of user data is performed accurately, in a timely and time saving manner.

By way of illustration, the extended caller-related information provided prior to, during, and/or after a call may include some or all of the following information:

a caller identifier (e.g., the caller name and/or a unique code that identifies the caller), the current status of the caller (e.g., what the user is currently doing, is the user available or unavailable, etc.), the location of the caller, the future plans/future status of the caller (e.g., future travel dates and locations of the caller), previews of documents the caller wants to share with the called party, which may optionally be displayed on the called party's communication device as a thumbnail or as a wallpaper (visually underlying other caller ID information), the weather at the current location of the caller, the local time of the caller, the subject matter of the caller, the importance of the call (e.g., "urgent", "low priority", etc.), information provided by the caller via an electronic form provided by the called party, the activity history (e.g., a log of prior communications transmitted via the communication system between users and/or other interactions); etc.

By way of illustration, if the call is regarding a medical insurance claim form, and the called party is an insurance provider, a claims form may be automatically provided to a user when a user activates a "submit a claim" menu item. The form may include fields for such information as the caller name, insured's name, relationship of patient to insured, patient date of birth, patient social security number, the insurance policy number, employer name, insured's employment status, an indication as to whether the claim relates to an illness or an accident, and if the claim relates to an injury, an indication as to whether the accident is work related, the nature of the illness or injury, an indication as to whether the patient is covered by other insurance, etc. This information may then be presented to the insurance agent before or during the call, enabling the insurance agent to more quickly process the claim and to determine if additional information is needed. During the call, the called party may cause additional forms to be presented to the caller via the caller's communication device.

By way of further example, a called party may receive extended data from a plurality of sources prior to, during and/or after a call from a user. For example, if a user activates a menu item for a service provider, such as for scheduling an appointment with a doctor, extended user information may be provided for display on a terminal associated with a scheduler associated with the doctor from the user's communication device, from the communication system database, and from the database of other sources, such as businesses with whom the doctor has a business relationship. For example, an insurance provider providing coverage for the user may transmit, via the communication system, insurance coverage information for the user (e.g., co-pay, coverage amounts, family members covered under the user's insurance policy, etc.), which may be provided for display to the scheduler prior to and/or during an optional voice call.

Optionally, the user may be authenticated prior to establishing a voice call with the scheduler and/or prior to third party sources being requested to provide contextual information. The authentication may be provided to the service provider and to one or more partners of the service provider, to thereby accurately identify the user and to enable the service provider and partners to locate, access, and provide user-related information.

A given data session may be persisted over two or more calls (e.g., until the relevant issue that that is the subject of the data session has been completed). Thus, for example, if a call is interrupted, the caller may place a second call to the called party, and the information previously provided by the caller is made available to the called party without the caller having to reenter or otherwise provide the information again. Optionally, if the time between the first call and the second call is less than a predetermined threshold of time, then the second call is substantially immediately answered by a service representative (even if there are other calls that are already queued). Optionally, if the time between the first call and the second call is greater than or equal than the predetermined threshold of time, then the second call is queued for service after other calls from other callers received prior to the second call. By way of example, the data session may be persisted until the subject matter of the call (e.g., status of the insurance claim) is resolved.

In certain embodiments, a caller and/or the communication system can generate a media-rich caller ID, including text, images, sound, links to web pages or other network resources, meeting invitations, and/or videos/animations. The rich media caller ID may then be displayed/played to the called party prior to the called party answering the call and/or after the called party answers the call, thereby giving the called party context for the call. Optionally, if the called party does not answer the call, the rich media caller ID may be stored for later access by the called party (e.g., as part of a missed calls log).

By way of example, the rich media caller ID may include some or all of the extended information discussed above (e.g., the current status of the caller, the location of the caller, the future plans/status of the caller (e.g., future travel dates and locations of the caller), previews of documents the caller wants to share with the called party displayed as a thumbnail or as a wallpaper (visually underlying other caller ID information), the weather at the current location of the caller, the local time of the caller, the subject matter of the caller, the importance of the call (e.g., "urgent", "low priority", etc.), information provided by the caller via an electronic form provided by the called party, authentication information and/or authentication verification, third party data from other sources (which may be user-related data identified and accessed from or by the third party using authentication information) etc.

Certain embodiments generate or access a customized menu (which may be accessed by a user from a social network site webpage, an application hosted on a user device such as a mobile phone, or otherwise) for a given contact (e.g., a service provider or a friend) of the user based at least in part on:
  current information from the user,
  information provided (e.g., automatically provided) by a device of the user (e.g., time, location information, user status),
  information previously stored in a user profile,
  information from other sources (e.g., news reports, weather reports, traffic reports, social graphs from a social networking service),
  popular menu items/topics selected by other users,
  relationship of user with other entities (e.g., businesses and/or other individual users),
  level of authentication of user (e.g., is the user an unauthenticated guest or an authenticated and identified user),
  and/or
  who/what the contact is, and/or menu items specified by the contact (e.g., on whether the contact is an individual or a business, and if the contact is a business, which business (e.g., an insurance provider, a doctor, an airline, a car rental company, a government agency, etc.).

In addition, a user may explicitly instruct the system to include certain menu items in one or more specified menus.

The menu items may include items relating to requests for information, requests for services, information being provided by the user, or services provided by the user, by way of example. The menu may be displayed to a user in conjunction with and prior to the user initiating and/or participating in a voice call. For example, if a menu item is selected by a user via a user communications device, a data message (e.g., included text, images, multimedia) related to the menu selection may be transmitted to a recipient for display on the recipient's communication device, and a call may be automatically placed at approximately the same time to the recipient's communication device. Call answering and call decline controls may be presented on the recipient's communication device together with the data message contents, thereby enabling the recipient to determine who the caller is, the urgency of the call, and the subject matter of the call prior to answering or declining the call.

The customization of the menu may affect which items are included in the menu and/or the order in which menu items are included. For example, the menu can include one or more of the following items (and/or other items), in any selected order:
  physical address (of contact);
  nearest location (of contact);
  call contact;
  contact information (e.g., phone number, email address, etc.) (of contact);
  hours of operation (of contact);
  schedule an appointment (with contact);
  check on status (e.g., of an order, of a claim being processed, of a repair, etc., as appropriate);
  submit a complaint (to contact);

process a return of an item (to contact);
request a refund (from contact);
submit a complaint (to contact);
place an order (with contact);
ask for a quote (e.g., for a product or service);
view user profile maintained by or defined by contact;
view insurance coverage benefits and co-pays;
locate a medical service provider;
food items (e.g., where the menu is a menu for a restaurant and where the user can select food items by selecting a corresponding menu item, which are then added to the user's order);
authenticate me (which may be used by the user to request that the user be authenticated during a session so as to obtain user-specific information from the called party and/or other sources);
where are you?
when will you get here?
what time are we leaving?
what time do we need to get there?
what time is our flight?
what is our flight number and airline?
where are we meeting?
will you be home for dinner?
are you working late?
I will be out of town,
when will you be out of town?
can you recommend a restaurant?
I need items from the store,
etc.

Thus, for example, if the contact is a bricks and mortar store, the menu may include, by way of example and not limitation, items in the following order:
"Nearest location" to user (e.g., based on location/GPS information from the user's device);
"Hours of operation";
"Call information desk";
"Process a return".

In this example, if the user selects "nearest location" from the menu, the location of the user will be submitted to the contact, and the contact may use the location information to automatically determine the nearest store location to the user, and then transmit back to the user the address of the nearest store. In this example, if the user selects "hours of operation", the request for the hours of operation will be submitted to the contact, which may then respond with the contact's hours of operation. If the user selects the "call contact information desk", then certain extended information may be sent for display to the terminal of the contact's information desk (e.g., the user's name and location), and a voice call will be routed from the user's communication device to the contact's information desk. If the user selects "process a return" from the menu, the user may be presented with a form via which the user can enter information regarding an item that the user wants to return to the contact.

By way of contrast, if it is determined that the user already has an outstanding order with the bricks and mortar store (e.g., as determined from a user identifier and data accessed from a database of the store), based at least in part on such determination, in this example the menu may be automatically altered or generated to include a different set or order of menu items, such as:
"What is the status of my order?";
"Cancel an order";
"Hours of operation";
"Call information desk".

By way of yet further example, the composition of a menu may be based at least in part on the level of authentication of a user. For example, with respect to a menu for a financial services provider (e.g., a bank), if the user has not been authenticated by the communication and/or the financial services provider, the menu items may be limited queries for non-confidential information (e.g., not relating to the user's account) and optionally may include a control requesting that the user be authenticated so that the user can access additional information. The following is an example of such a menu:
"Where is the nearest branch?";
"Hours of operation";
"Authenticate me";

If, instead, the user has been authenticated (e.g., via a userID, password, a unique identifier of the user terminal, such as a NIC (Network Interface Card) identifier, etc.), the menu may be configured to include menu items related to requests for user-specific and/or confidential information, such as:
"Account balance";
"Next payment due date";
"Make an online payment".

Optionally, the user may initiate a session without being authenticated, and a first menu may be presented for non-authenticated users that does not include menu entries for user account-related information. Then, at some time during the session, the user may opt to be authenticated (e.g., by activating an "authenticate menu item", which may cause pre-stored authentication data to be passed to the communication system and/or the service provider, or by causing a log-in interface to be displayed to the user via which the user can enter log-in/authentication information). Once the user has been authenticated, the menu may be updated/modified in substantially real-time to present a second menu, including menu items related to requests for user-specific and/or confidential information.

Thus, the menu presented on the user device has been modified or replaced to include menu items that are more applicable to the characteristics of the user at a given point in time, and in an order or arrangement that may more closely reflect the user's interests at a given point an time.

Certain embodiments may involve a consumer and multiple service providers in a single data and/or voice communication session. For example, a user may contact the user's medical insurance provider to determine which doctors are authorized providers, and may, at the same time, make an appointment with an authorized doctor. By way of further example, if a caller involved in a car accident selects a menu item which initiates a call to the caller's auto insurance company, the location of the caller may be provided to the insurance company using the user's mobile phone GPS location information via an application hosted on the caller's mobile phone. The insurance company or system may conference in a tow truck company, and the tow truck company may be presented with the location of the caller. The tow truck company may send a tow truck to the caller's location, while the insurance company continues taking information from the caller. Thus, certain embodiments facilitate scheduling of appointments that may involve interactions between three or more parties (e.g., the caller, a service provider of the caller, and a partner of the service provider).

By way of further example, a user interface including a plurality of data entry fields may be provided to a user. It is understood, that unless the context indicates otherwise, the phrase "data field" with respect to a user interface includes a mechanism via which a user can enter or specify data (e.g., text fields, menus, links, etc.). The user interface may be provided via an application (an "app"), downloaded onto a user terminal (e.g., a mobile phone, desktop computer, laptop computer, interactive television, etc.), via a Web page (e.g., associated with a social networking site or other site), built-in to the user terminal, or otherwise.

For example, in the context of an insurance provider interaction, the user interface may include fields via which the user and/or the user's insurance policy may be identified (e.g., one or more fields via which the user can specify the user's insurance policy number, member identifier, phone number, email address, home address, etc.). This information may be used to access one or more records relating to the user and/or the user's insurance policy stored in a database (e.g., stored on the user's computer system, the system, or the computer system of the insurance provider). Some or all of the accessed information may be provided for display to a party (e.g., an insurance agent) being called or about to be called by or on behalf of the user. For example, the information may include details on the user's insurance policy (the deductible, the services covered, the number of visits covered, etc.), information on the status of pending insurance claims, information on past claims, etc. This provides context for a voice call with the user, and optionally, the insurance agent may transmit a text message to the user, answering user queries, without having to take a voice call from the user.

With respect to a menu activation/data communication and/or voice call, certain embodiments enable extended information to be shared with users and networks other than or in addition to a recipient to whom the user is directing such menu activation/data communication or voice call. For example, if the user submits a query, (e.g., by entering a question into a corresponding text field or by activating a menu item that corresponds to a query), the query and other extended information may be provided to the intended recipient (e.g., a given department of a service provider, such as a customer service department), and may also be provided to other recipients (e.g., other departments of the service provider or customers of the service provided) who may be able to answer the query.

For example, if a user submits a query via the system to a customer relations department of a service provider asking when a price increase for an item will go into effect, the query may also be shared with an accounting department of the service provider and with selected other customers of the service provider, who may already know the answer to the query and who can respond to the user, thereby obviating the need for the service provider customer relations department to answer the question. This approach may result in the reduction in the number of customer relations personnel that are needed on standby to answer such customer queries. Optionally, users may opt-in to receive from and respond to (e.g., via data communications and/or voice calls) queries from other users generally or in specific areas of expertise or interest (e.g., with respect to insurance related information, flood related information, medical related information, etc.) designated by the users, system, or otherwise. Thus, users may collaborate together to respond to queries from other users.

A call may be routed by the communication system based at least in part on extended information/contextual information received from a user device. For example, the user's geo-location (e.g., provided by the user's communication device, such as GPS, WiFi station information, or local cell phone tower identification) may be used to route the call to a local or closest geographical call center or to agents servicing that geographical area. By way of further example, in the context of a user seeking assistance with their computing device (e.g., a smart phone), the user may activate a corresponding menu control indicating the user needs assistance with the computing device. The computing device transmits information corresponding to the menu selection and the version of the computing device operating system, which is then used to automatically route the call to the correct set of agents trained in solving the problem related to that operating system version and the menu item selected.

Certain embodiments will now be described with reference to the figures.

FIG. 1 illustrates an example system, including an example communication coordination system 100 that may coordinate data and voice communications. A database 104 stores topics searched for by users, custom user data, session status information, user-to-user data, historical communications between users, user account data, relationship information indicating which users have an association (e.g., are friends or have a business relationship), user status, etc.

An API cluster system 106 provides, over a network 114 (e.g., a wide area network, such as the Internet), an application programming interface which optionally may be used to provide interfaces to an end user's computer terminal, mobile device, interactive television, or other terminal. Further, the API cluster may optionally be used to provide an interface to a computer system of a business client of the services offered by the system such as the computer system of a service provider (or of a prospective service provider) of the user.

A Web cluster 102 includes a plurality of computer systems hosting a website which may be accessed by users (e.g., a personal user or a customer service representative).

The system may be accessed by a service provider (e.g., a service provider agent) terminal 112, a mobile device 110 (e.g., a smart phone) operated by a user, a desktop computer 108, or other device.

The system further provides telephone call processing for traditional POTs (plain old telephone system) voice calls, voice over internet protocol (VoIP) communications, wireless telephones, etc. For example, the illustrated system may provide some or all of the following functions:

Initiate an outbound call
Insert an outbound call into a call queue
Remove a call from the call queue
Get the wait time for the call queue
Get the number of callers in a call queue
Detect Call (Caller/Agent) answered
Detect the agent transferring a call
Detect the agent conferencing a call
Detect the agent putting the call on hold
Detect the (Caller/Agent) disconnecting a call
Answer a call
Disconnect a call
Transfer a call
Create a conference call if no available conferences exist
Add a call to a conference call
Remove a call from a conference call
Hold a call The system may transmit the status of the call, including some or all of status conditions related to the functions above, to the caller and/or the called party.

Figure 2A:
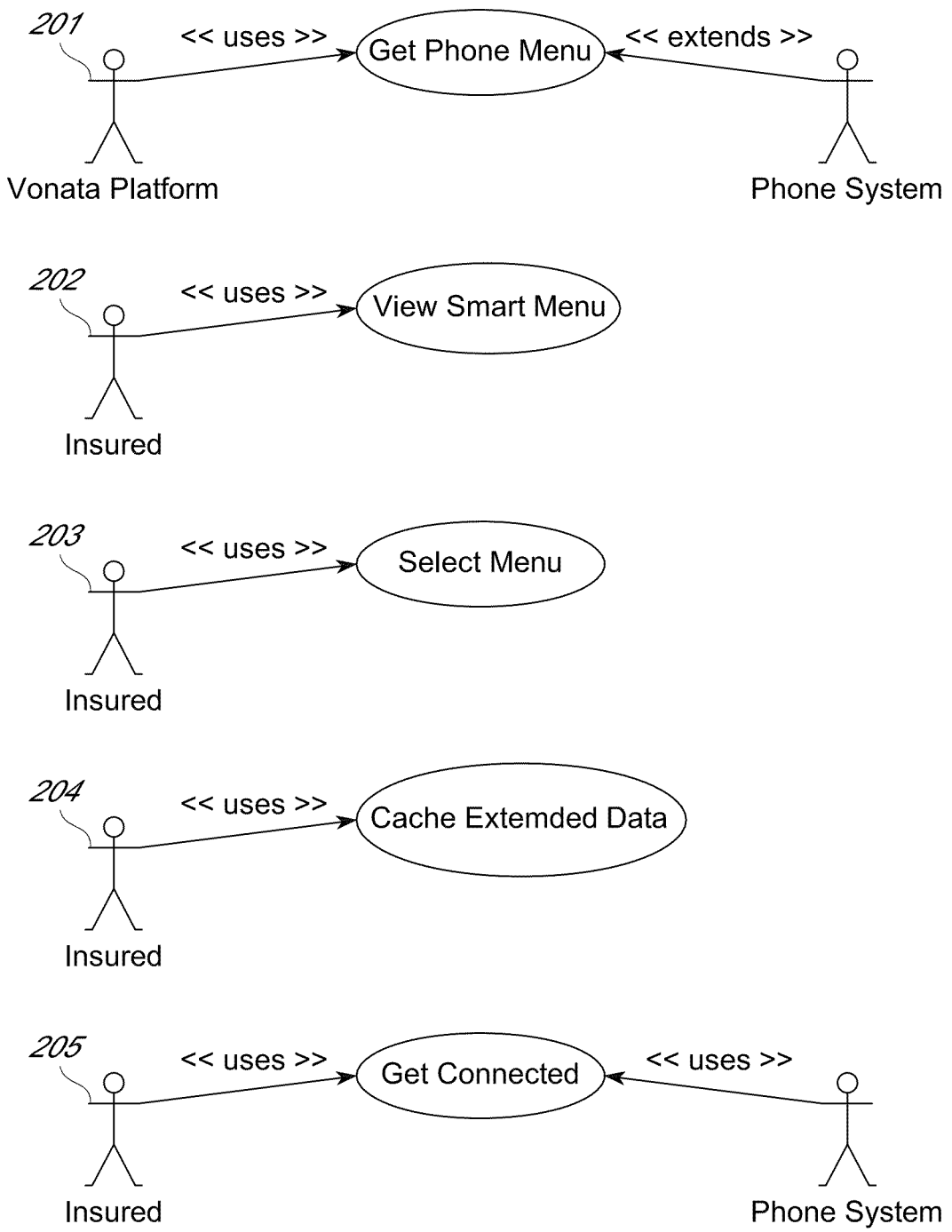
FIGS. 2A-2B illustrates a first example communication process.

FIG. 2A illustrates example user/system interactions. This example relates to a communication interaction between an insured and an insurance provider, via a system, such as the communication coordination system illustrated in FIG. 1. At level 201, based at least in part on extended information regarding the user (which may include static information, such as the user name, and/or dynamic information, such as the user's location) and/or external data (e.g., traffic or weather reports, information from the user's service providers and partners thereof, user account data, historical communications and interactions with the user's service providers and partners thereof, etc.), the system modifies, generates or retrieves a menu appropriate for the user and/or a contact (e.g., a service provider) of the user. The custom menu is provided for display on the insured's/user's communication device (e.g., mobile phone).

For example, if the extended data indicates (e.g., via GPS information) that the user is stationary on the side of a highway, the system may infer that the user has had an accident or has broken down. The system may therefore generate or retrieve a menu for an insurance provider contact, which includes, in the following order, a "call highway patrol" control, a "call for roadside assistance" control, and a "submit a claim" control. If, instead, there is not an indication that the user has had an accident or breakdown, but it is determined that the user has a claim pending with the insurance provider, the system may generate, modify, or retrieve a menu for the insurance provider contact, which includes, in the following order, a "What is the status of my claim" control, "I would like to speak to an agent" control, and "I would like to submit a new claim" control, to thereby provide a more relevant menu.

At state 202, the insured views the menu (also termed a "smart menu") displayed on the insured's terminal. At state 203, the insured selects a menu entry. At state 204, some or all of the extended data is cached so that it can be quickly accessed and/or displayed. The cached data may be stored in association with a session key (sometimes referred to as a beat or sub-session identifier), which may be used to later retrieve the cached data.

At state 205, a voice connection is then made (e.g., over a cellular, landline, or VoIP network). The voice connection may be made during the initial data session (while the extended data is displayed on the insurance provider terminal), immediately upon completion of the initial data session, or some time later (e.g., 1 day or 1 week later). The call may be originated from the insured's communication device, from the insurance provider's (e.g., agent's) communication device, or from the communication coordination system.

Figure 2B:
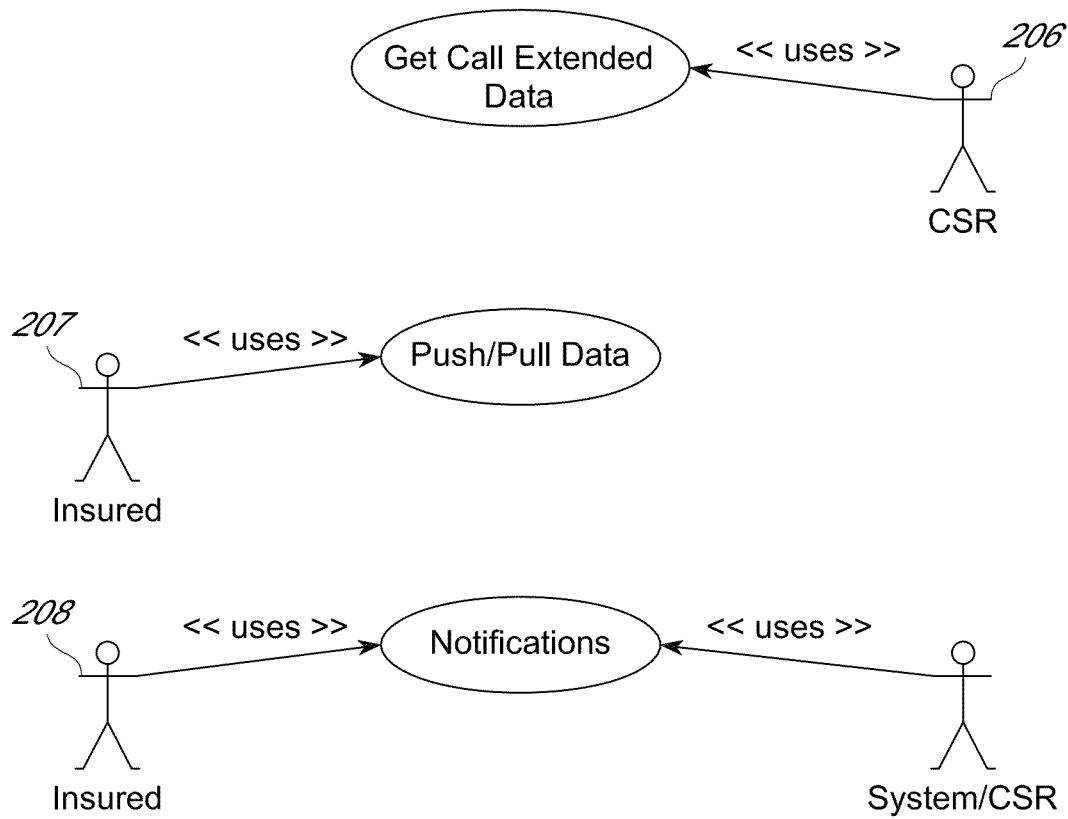

Referring to FIG. 2B, at state 206, some or all of the extended data is retrieved from the cache and presented to the insurance provider's customer service representative (CSR) via a respective terminal. The extended data related to the user may be provided for display on a terminal of the insurance provider before the call connection is made, while the call connection is in progress, and/or after completion of the call. At state 207, data is pushed to and/or pulled from the user's communication device. After the voice communication has been completed, at state 208 one or more notifications may be exchanged between the insured and the system/CRS. For example, the CSR may transmit a form to the insured for scheduling a visit by an adjuster. By way of further example, the notification may provide the insured with status on the processing of the insured's claim.

While the above example discusses an interaction between a consumer and a business, in other situations, the communication may be person-to-person (e.g., friend-to-friend). In such interactions, different types of extended data may be exchanged. For example, a user interface may be presented via which the caller can enter a textual description regarding what the caller wants to discuss with the called party and may include a control via which the caller can indicate the urgency of the call. In addition, data may be accessed from the caller's social network account (e.g., the caller's social graph information), and certain of this information may be included in the extended data presented to the called party via an enhanced caller ID or otherwise, in conjunction with a caller identifier and the subject provided by the caller. For example, the included social network information may relate to recent activities of the caller (e.g., recent trips, movies attended, restaurants patronized, etc.) that the caller may have posted to their social network site wall.

Figure 3:
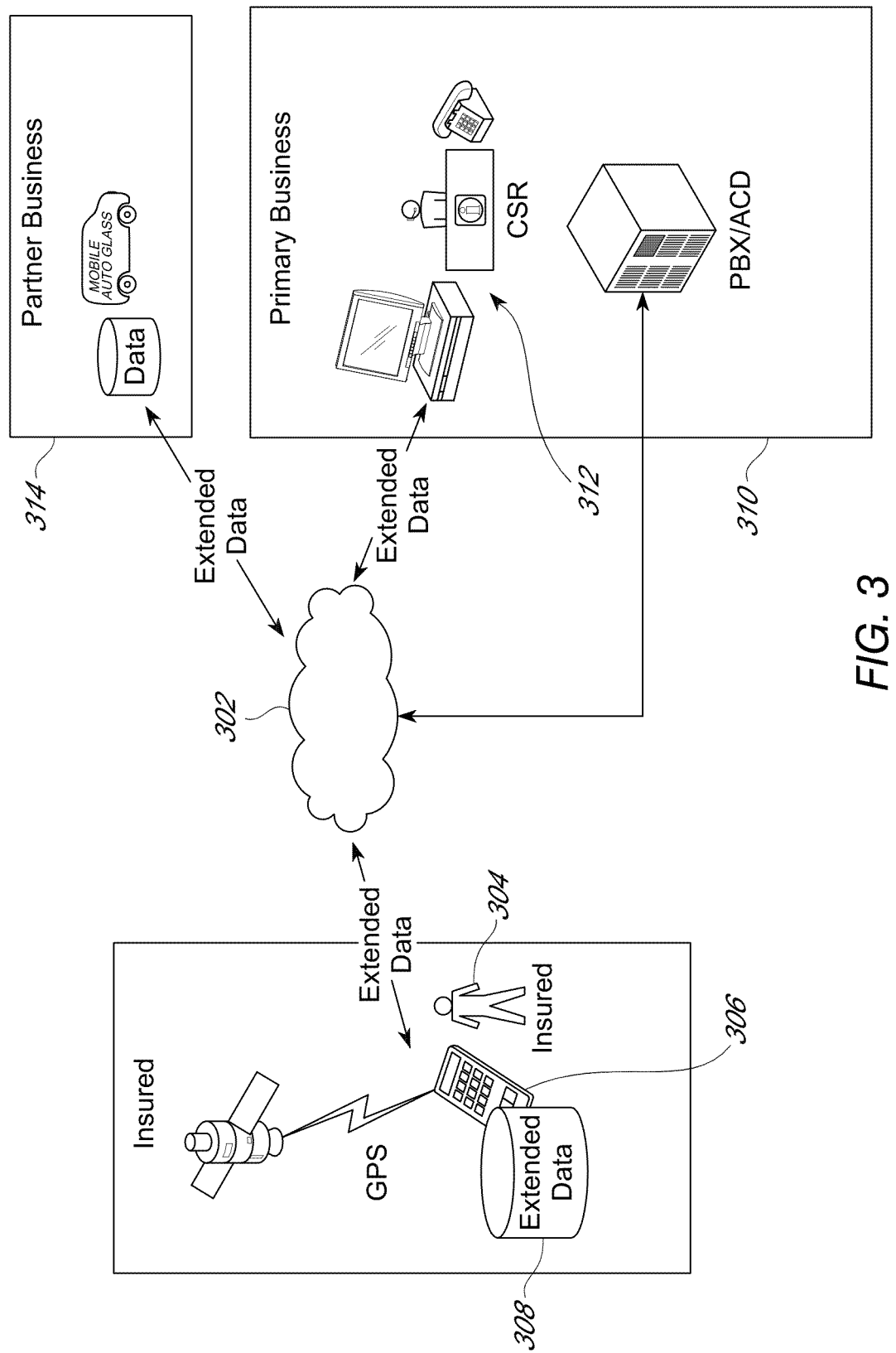
FIG. 3 illustrates an example communication flow.

FIG. 3 illustrates an example many-to-many communication interaction synchronized by a system 302 (e.g., the communication coordination system illustrated in FIG. 1). In this example, an insured 304 initiates a communication with the system 302 (e.g., via a menu item presented by an application downloaded and installed on the user's communication device 306). Extended data 308 is transmitted from the user communication device 306 to the system 302. The extended data 308 may include GPS location information, current date/time information, and/or an identification and/or authentication data (e.g., user ID, password, birth date, place of birth, last 4 digits of the user's social security, a token, a private key, and/or other authentication data) of the user. The location information and time information may indicate that the insured is stationary, on the side of a highway, at 2:00 AM. From this information, the system 302 may infer that the insured's vehicle has broken down, and is pulled over to the side of the highway. The system 302 forwards some or all of the extended data to the primary business 310 (e.g., an insurance provider), presents some or all of the extended data via a customer service representative (CSR) terminal 313, and connects the CSR 312 to the insured 304 via a voice call. The CSR 312 determines from the voice call that the insured has a windshield damaged from road debris and instructs the system 302 to contact a partner business 314 (e.g., a mobile automobile glass repair service).

The system 302 forwards some or all of the extended data (including location information for the insured) to the glass repair service 314 for display on a terminal, and causes a three way voice call and/or textual communication to take place, including the insured 304, the CSR 312, and the glass repair service 314 (e.g., where the glass repair service is added to the call between the insured and the insurance provider) confirming that the glass repair service will send a repair truck to the insured's location. The glass repair service 314 then sends a repair truck to the location indicated by the location information (which may include a visual map) in the extended data.

Figure 4:
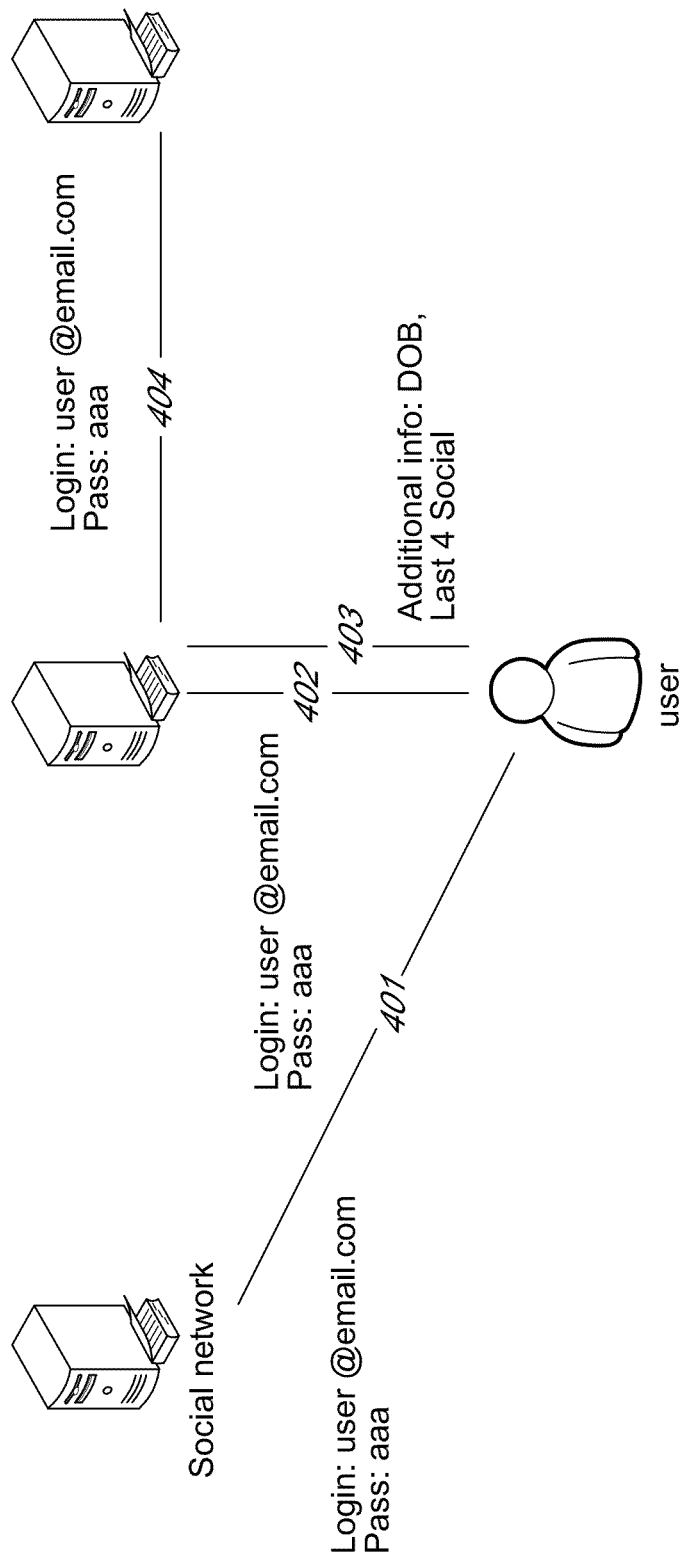
FIG. 4 illustrates an example account creation.

FIG. 4 illustrates an account setup process. At state 401, a user may access an account setup interface via a social network site application (e.g., where the user is already a registered account holder on the social network site), via a site hosted by another system (e.g., the communication coordination system illustrated in FIG. 1), or otherwise. In this example, the user provides a user identifier and a password or other authentication data associated with the user's social network site account. In this example, the communication coordination system gains access to the user's social graph via the social network site.

By way of illustration, the social graph may include a mapping of the user's connections with other people and entity, and an indication as to how they are related. For example, the graph may include a list of the user's friends, associates, and/or affiliations on the social network site, a list of companies the user is following, etc. The graph may include information on the user's relationship with another user (e.g., married, living together, coworkers, social friends, relative, fellow student at an educational institution, traveled together, dated, participate in sports together, co-member of a religious institution, co-member of a non-profit, service provider, customer, etc.). The graph may include an indication as to people, organizations, events, or material that the user likes, is interested in, and/or is an employee of. As discussed elsewhere herein, the information regarding the user may enable better and more customized services to be provided to the user, as well as offering such services to connections (e.g., friends) of the user.

The social graph information may be stored by the communication coordination system for later use and the system may periodically or upon the occurrence of certain events (e.g., a change in user status) receive and/or request updates to the graph from the social network site. The user may optionally be requested to opt-in/provide authorization to have the social network site share the social graph information with the communication coordination system.

At state 402, the system may ask the user to provide additional information where such information is not available from the social network site (e.g., date of birth, some or all of the user's social security number, driver's license number, insurance provider name(s), insurance policy number(s), medical care provider(s) identifier(s) (e.g., the name and/or contact information of the user's medical doctors, dentists, therapists, pharmacies, etc.), etc.). Such information may include authentication information (e.g., user ID, password, birth date, place of birth, last 4 digits of the user's social security, a token, a private key, and/or other authentication data) corresponding to the user's communication system account and/or accounts of other entities that the user may have a relationship with. The communication coordination system may then store this additional information in memory for later use. At state 403, the user provides some or all of the requested information. At state 404, the communication coordination system identifies one or more service providers of the user, the user is authenticated with respect to one or more user accounts with service providers, and accesses the system of one or more of the service providers, such as an insurance policy management system of an insurance company that insures the user. At state 405, the communication coordination system obtains additional information (e.g., insurance expiration date, insurance deductibles, insurance limits, authorized providers of services covered by the insurance policy, etc.) from the service providers.

Figure 5:
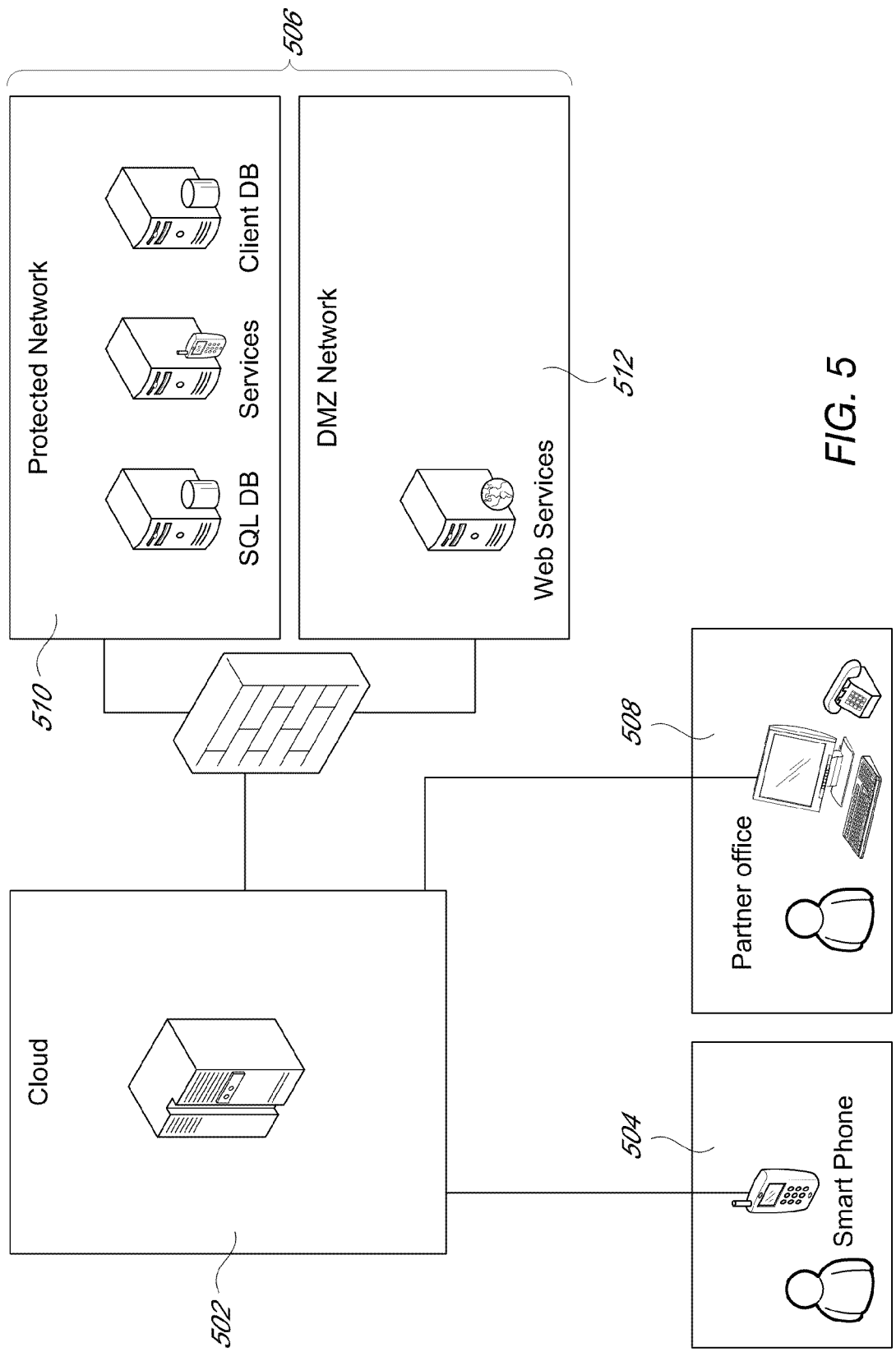
FIG. 5 illustrates another example architecture.

FIG. 5 illustrates an example interaction of the communication coordination system 502 with the user (via a user device 504 such as a smart phone), a service provider of the user (e.g., an insurance provider) via a service provider system 506, and a related party (e.g., a dentist office). The service provider system 506 may include a protected network, including one or more servers, one or more databases (e.g., an SQL database, etc.), and a CTI (computer telephone integration) system that provides call control and call status for calls between the user and the service provider. A DMZ network 512 (e.g., a sub-network of the service provider that exposes the provider's external services to an untrusted network, (e.g., the Internet)) provides Web services for the service provider 510.

In the illustrated example of FIG. 5, a user may utilize an application (e.g., a phone application), to request information regarding the user's dental insurance policy. For example, the user may activate a "what are my policy benefits" or a "which dentists accept the insurance" menu item. The query may be passed (e.g., as a text message) by the communication coordination system to the insurance provider system (optionally after a translation to make the query comply with the insurance provider's API).

The insurance provider's system 510 may respond to the query with the requested information via a text communication or a voice call to the user device 504, optionally including an identification of dentists within the geographical area of the user (e.g., with 5 miles radius or other specified geographical area) that have an affiliation with the insurance provider (e.g., that accept the policy limits imposed by the insurance provider as full payment for a given procedure, subject to a specified deductible). The data response may be forwarded by the communication coordination system 502 to the user device 504. During the same session, the communication coordination system 502 may provide a user interface via the user's device 504 which enables the user to select and schedule an appointment with a given dentist. The communication coordination system 502 may access the dentist's scheduling software hosted on a system associated with the dentist in order to determine what time slots are available for such an appointment, provide for display such time slot availability to the user, receive a selected time slot from the user, and add the appointment specified by the user to the dentist's schedule.

Figure 6:
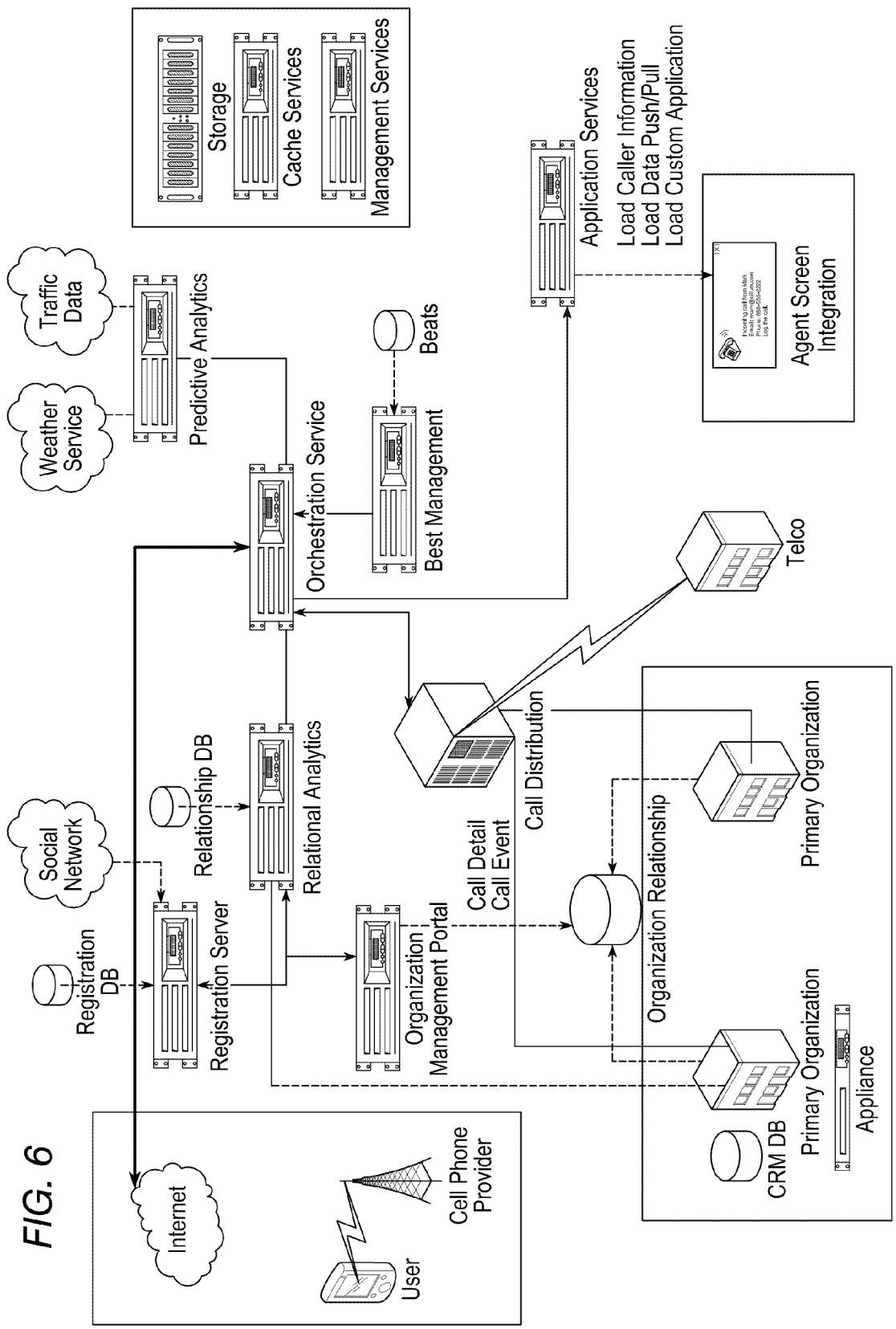
FIG. 6 illustrates another example architecture in greater detail.

FIG. 6 illustrates an embodiment of the communication coordination system architecture, including interfaces to a user and a user service provider. A registration server (coupled over a network, such as the Internet, to user devices, such as wireless communication devices) manages the registration process of a user with respect to setting up a user account and obtaining user related information (e.g., social graph information obtained from a social network, information provided directly by the user via a user interface, information obtained from a service provider of the user, etc.), defining one or more custom caller ID pages (where different information may be included in different versions of the user's caller ID pages, and the different caller ID page versions may be used for respective different called parties), and stores some or all of the information in a registration database and/or other databases.

A relational analytics server (coupled to the registration server) accesses the relational database and account registration information to analyze the information and determine user relationships (e.g., with other individual users and/or service providers), status, and/or interests, where such determination may be used to provide customized interfaces for the user, relevant information to the user, and relevant information to clients of the communication coordination system (e.g., service providers of users). Further, if the relational analytics server infers that a user may have a relationship with a given entity (e.g., where the user has "liked" a service provider), the relational analytics server may further infer the user is a customer of the entity or otherwise has a material relationship with the entity, and may store such inference in memory in association with an identifier of the user.

The relational analytics server may ask the user if the user wants to link to, friend, and/or share information with the entity (e.g., provide the entity with contact information of the user, enable the entity to view or access a social network site section association with the user (e.g., a user profile, messages, blogs, postings, friends, wall, etc.), provide some or all of the user information discussed herein via a caller ID page, etc.), and enable the user to do so.

A predictive analytics system accesses static or semi-static data from one or more sources for a given geographic or governmental area (e.g., weather reports, traffic data, road work schedules, holiday schedules, etc.) to predict what common queries will be received at a given time. For example, if a source indicates that there is a traffic accident on a given freeway, and all lanes are closed, the predictive analytics system may predict that many queries will be received from users regarding the cause of traffic slowdowns on the freeway. The system may prepare an answer to such query and modify user interfaces and menus for users in the geographical area (or just for users on the freeway downstream of the accident)

to include a notification regarding the accident. Thus, when a user in the area views the user interface presented via the application (e.g., hosted on the user's phone), it will include a notification regarding the accident.

A beats management system monitors and manages transactions/interactions/sub-sessions (also referred to herein as "beats") with the communication coordination system with respect to users, clients (e.g., service providers of users), and/or entities associated with users or clients (e.g., other service providers). By way of illustration, in an extended session regarding submitting a car insurance claim, a sub-transaction may relate to a request for a specific piece of information (e.g., a photograph or a completed form), wherein one party requests the piece of information and the other party provides the requested piece of information, which may complete the sub-transaction.

In certain embodiments, if an expected sub-transaction does not occur or is not completed, the beats management system may repeat the initiation of the sub-transaction. For example, if a client does not respond to query initiated by a user and forwarded by the beats management system to the client, the beats management system may resend the query to the client.

An application services system provides information for display on the terminal of an agent/customer service representative of the client. The application services system may load some or all of the extended information association with the user/caller, accesses and pushes/pulls data with respect to the agent terminal, and, if applicable, activates a custom application which receives, stores and/or processes such data (e.g., a CRM application, a claims management application, a scheduling application, and order processing application, etc.).

A call distribution system (connected to the orchestration service system, the call distribution system, the relational analytics system, the beat management system, and/or an application services system) performs call routing for voice calls. An orchestration service system determines when to combine voice and data, reconnects prematurely dropped voice connections and/or data connections. Optionally, if the call distribution system performs a reconnection, the call distribution system determines at what point in a transaction the connection was dropped, and restarts the transaction at that point (rather than at the beginning of the transaction).

An organization relationship system (coupled to a client system and a system of a partner/affiliate of the client) coordinates relationship and interactions with users, clients, and client affiliates. For example, if a user makes an appointment with a doctor via the system, the organization relationship system establishes a relationship with the user's medical insurance provider, pharmacy, etc.

Figure 7:
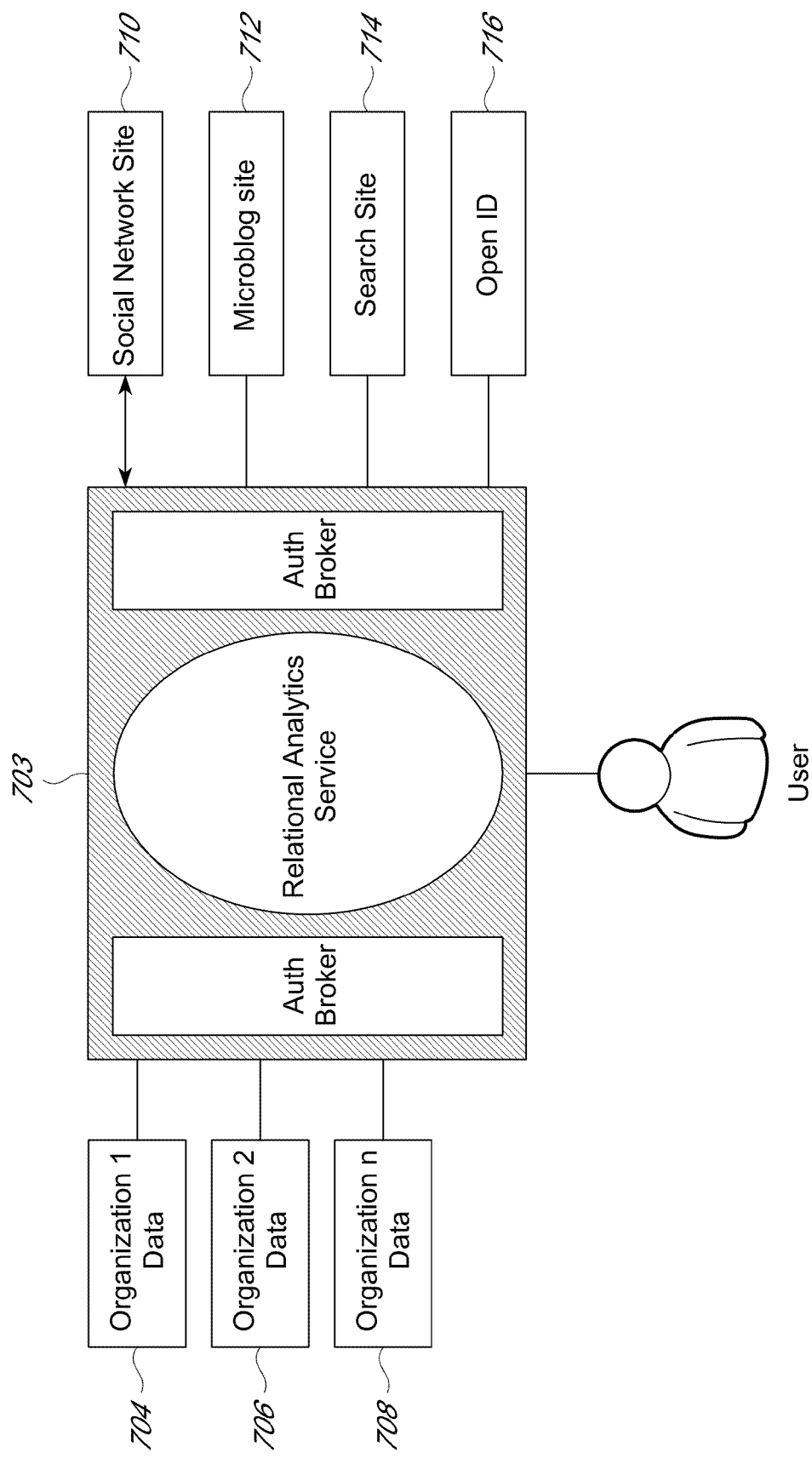
FIG. 7 illustrates an example relational analytics service architecture.

FIG. 7 illustrates a detailed depiction of an example relational analytics service system and interfaces. The example relational analytics service system 702 is coupled to systems of one or more organizations 704, 706, 708 (e.g., clients of the communication coordination system) to receive data used to infer and/or established relationships. Additional information is accessed via search engines 714, social network systems 710, blogs, short message communication systems, microblogging services 712, OpenID 716 (an identifier/password which may be used at multiple participating websites, and which associates an identifier/password with other user information, such as email addresses), etc. By way of illustration, the relational analytics service system 702 may access information from different sources and use the information to determine a user's relationships with other individual users, groups, companies, and/or other entities. For example, the relational analytics service system 702 may access the user's name, phone number, birth date, and city of residence from a first source (e.g., a social network system), and determine whether a company (e.g., an insurance provider) has a customer with the same or overlapping identifying characteristics. Depending on the degree of matching characteristics, the relational analytics service system may determine whether a relationship exists between the user and the company. By way of further example, if a user has "liked" a particular company on a social network site, the example relational analytics service system 702 may infer that the user is a customer of the company, and may offer the user to link to the company. Thus, the example relational analytics service system 702 may determine user relationship from some or all of the foregoing sources, and the user may be asked if the user wants to confirm the relationship and/or agree to share information with the related entity.

Figure 8:
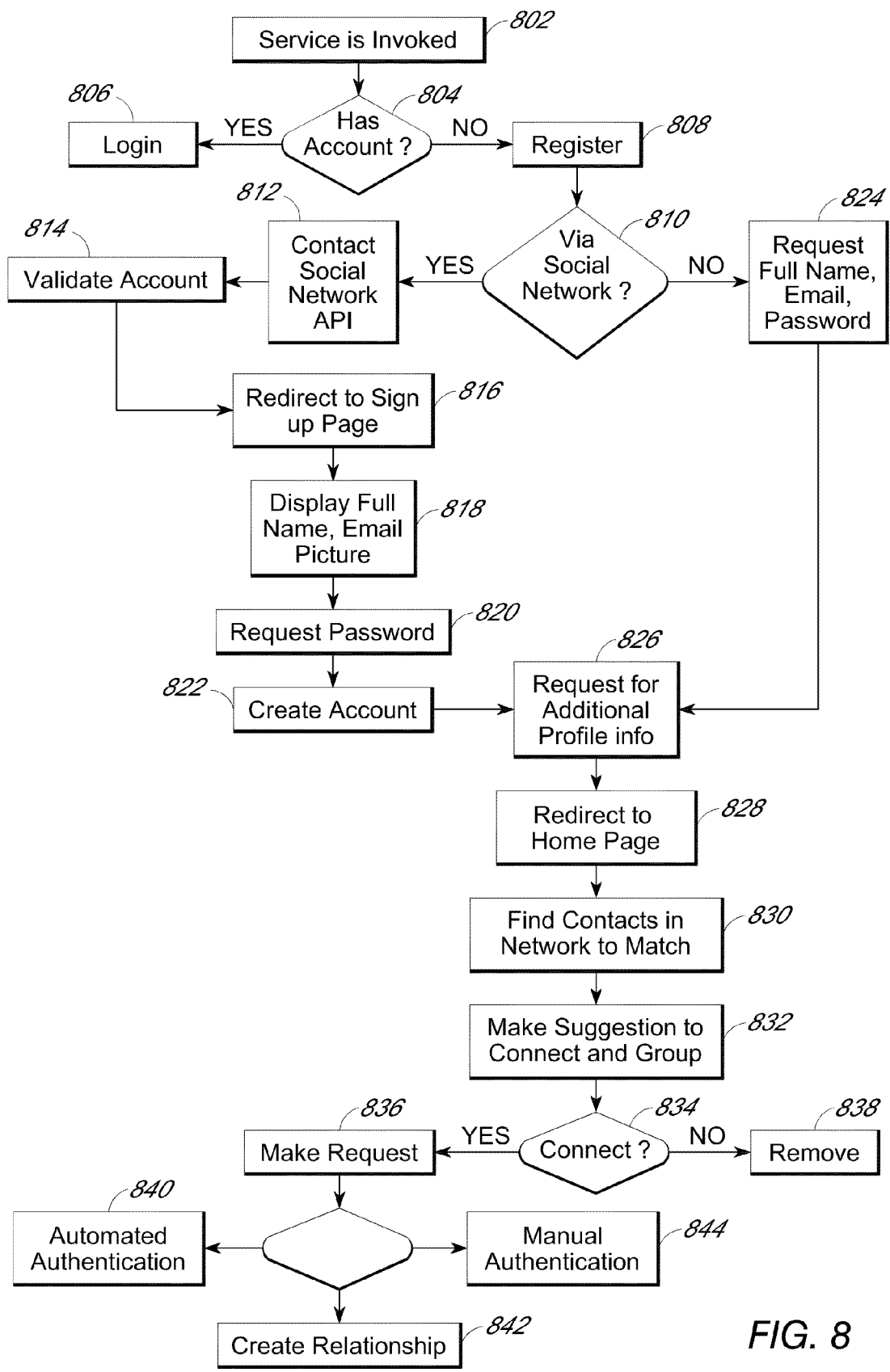
FIG. 8 illustrates an example registration process.

FIG. 8 illustrates an example registration process. By way of example and not limitation, the process may be executed at least in part by the communication coordination system discussed above. At state 802, the service is invoked. At state 804, the process determines if the user already has an account. If the user does have an account, at state 806 the user may login (e.g., using a user identifier and/or password). If the user does not have an account, at state 808 registration process begins.

The user may then be asked, at state 810, if the user has an account with one or more specified social networking sites. If the user answers affirmatively, at state 812m the communication coordination system contacts an application programming interface (API) of the social networking site, which at state 814 validates the user account (e.g., by enabling an application to interact with the API on behalf of the user to thereby provide a sign on mechanism across Web, mobile, and/or desktop applications), and at state 816 redirects the user to a sign-up page. At state 818, the sign-up page may display the user's name, email address, photograph, and/or other information related to the user from the social networking site. At state 820, the user may then be asked to provide a password. If the password is verified, at state 822 a user account is created.

If the user does not have such an account with one of the specified social networking sites, at state 824 the user is requested to provide user information (e.g., name, email address, password, mobile phone number, and/or other information) for the account, which is then stored in memory.

At state 826, the user may be asked to provide still additional information for the user's profile. For example, the user may be asked to provide a home address, date of birth, some or all of the user's social security number, driver's license number, insurance provider name(s), insurance policy number(s), medical care provider(s) identifier(s) (e.g., the name, tax ID, and/or contact information of the user's medical doctors, dentists, therapists, pharmacies, etc.), etc. Different information may be used to authenticate the user for different clients/companies.

At state 828, the user's browser or other navigation interface is then redirected to a home page associated with the communication coordination system. Based on the information obtained regarding the user and/or on information from other users (individual users or companies), the process identifies other users with whom the registering user has or may have a relationship. For example, at state 830, the process may access contact databases of other users, the user's likes, entities the user is following online, etc., to identify other users that the registering user may know, as similarly discussed above.

At state 832, the process then provides for display on the registering user's browser an identification/suggestions of other users with whom the registering user may have a relationship or may otherwise want to connect to (where connected users may share information via the social networking site and/or via the communication coordination system) and/or define an online group (e.g., an interest group) with.

The registering user can request a connection with a given other user be removed or can request to that a connection be made. At state 834, a determination is made if the user has submitted a connection request. If the user requests (state 836) to make a connection with another user, the requesting user may be automatically authenticated at state 840 or manually authenticated at state 844, the connection/relationship is established at state 842, and a corresponding indication is stored in memory.

Optionally, the system may also enable the user to post a review or opinion of a service provider on an interaction with the service provider during a call, immediately after a call, and/or sometime thereafter. For example, certain embodiments may present a menu item for posting text or a visual rating (e.g., a review or opinion) on a social networking website regarding a call with the service provider and the quality of service provided during the call. When the user activates the posting menu item, a data entry field is presented (which may be an SMS, MMS, email, web form field, or other data entry field). If the user enters text (or a symbol, such as a happy face emoticon for good service and a frown face emoticon for poor service) into the field and activates a "send" control or the like, the text and/or symbol are transmitted to the system. The system determines which service provider the text and/or symbol are associated with (e.g., via a call record associated with the user indicated that the user is conducting or has recently completed a call with the service provider), and posts the text on a social networking page of the service provider and/or on a social networking page of the user (e.g., where the system gains access to the user's page via authentication information and an authorization indication from the user). Thus, the user can substantially instantly post a rating or review regarding a call while the call is still fresh in the user's mind through a quick and user-friendly process.

Figure 9:
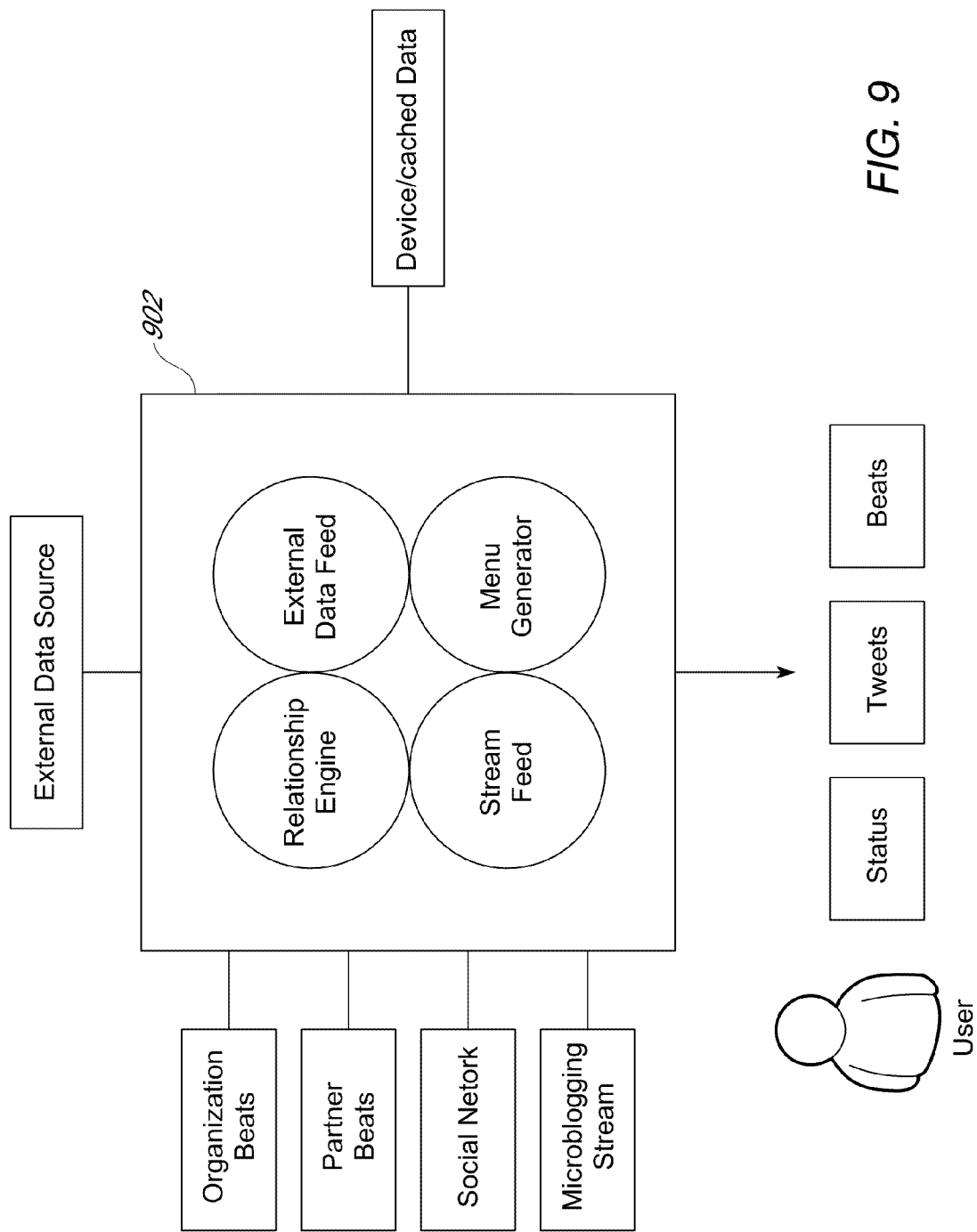
FIG. 9 illustrates data interfaces.

FIG. 9 illustrates communication coordination system inputs/outputs with respect to an example user session. In this example, the communication coordination system 902 includes a relationship engine, as similarly discussed above, an external data feed (that obtains data such as weather data, traffic data, social network user status data (e.g., from Facebook®, LinkedIn®, etc.)), interactions with clients (e.g., that a user is contacting), interactions with partners of clients (e.g., that the user did not initially initiate a contact with), messages from messaging systems (e.g., Twitter®), etc., and a stream feed (e.g., that generates text/data notifications to the user during and/or after completion of a voice call).

The communication coordination system 902 can determine user status (e.g., is the user logged in, in active, etc.), monitor user communications (e.g., via a public messaging or microblogging service, such as Twitter) and track the status of user sessions and sub-sessions/beats. The communication coordination system may store some or all of the foregoing data and information in a cache for quick access.

A menu generator may access, generate, and/or modify one or more menus based in whole or in part using the obtained data and information, and then provide the one or more menus for display on the user's terminal.

Figure 10:
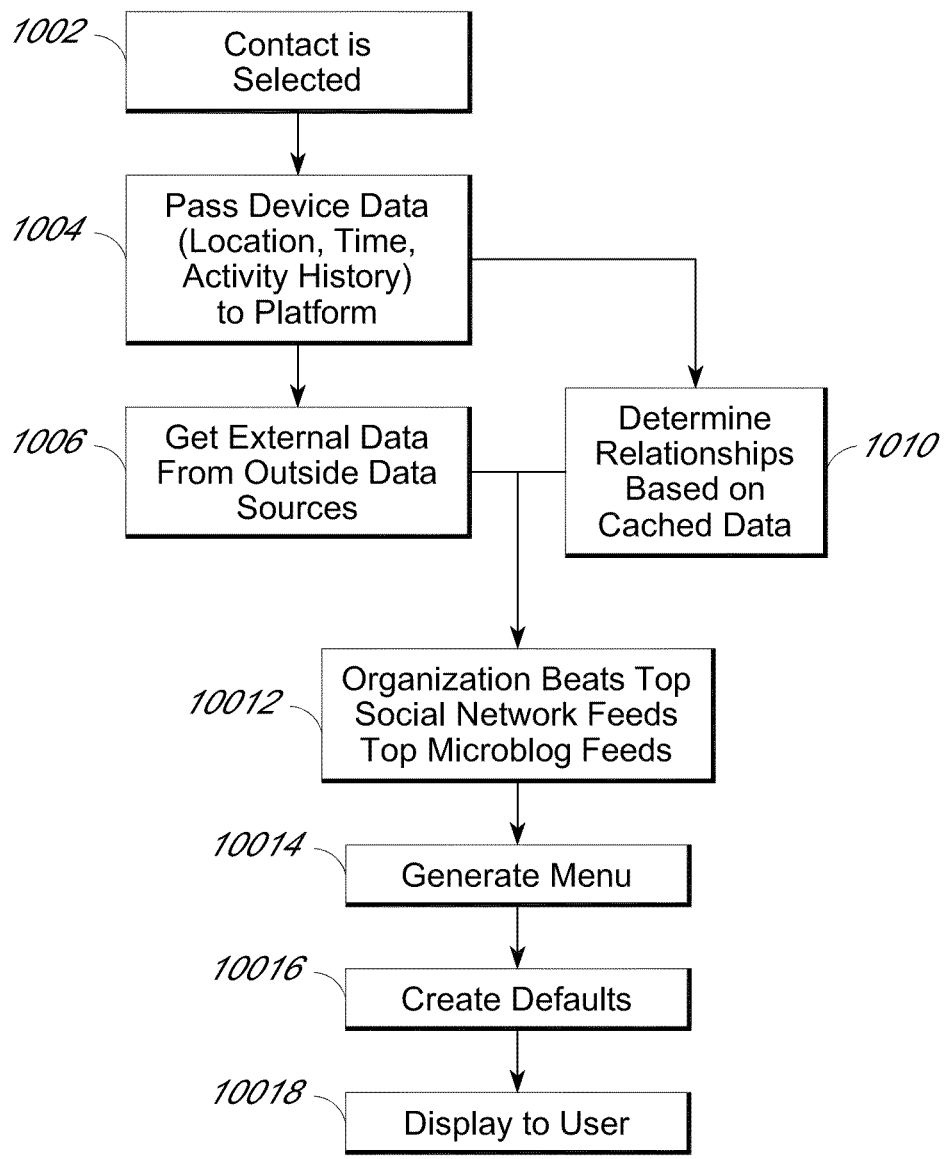
FIG. 10 illustrates an example communication initiation process.

FIG. 10 illustrates an example communication initiation process. At state 1002, user selects a contact (e.g., from an application on the user's communication device, which may have been downloaded from the communication coordination system). The contact may be a personal contact or a business contact (e.g., a service provider of the user, such as an insurance provider). At state 1004, some or all of the extended data discussed above may be passed by the device and/or other source to the communication coordination system. At state 1010, the extended data may be cached and used to determine relationships of the user with other users (individuals or other entities).

At state 1012, the process accesses social network feeds and microblogging feeds. Using the extended data, data from the social network feeds, and/or data from the microblogging feeds, at state 1014 the process generates a menu enhanced for the user. At state 1016, menu defaults are generated or accessed. The generated menu may include default types of information or selections previously specified by the user (e.g., a "what time do you open" menu entry for a retail establishment). At state 1018, the menu is then provided for display to the user via the user communication device. Once the user selects a certain menu item, a form may be presented for the user to collect additional information prior to a call being initiated.

Figure 11:
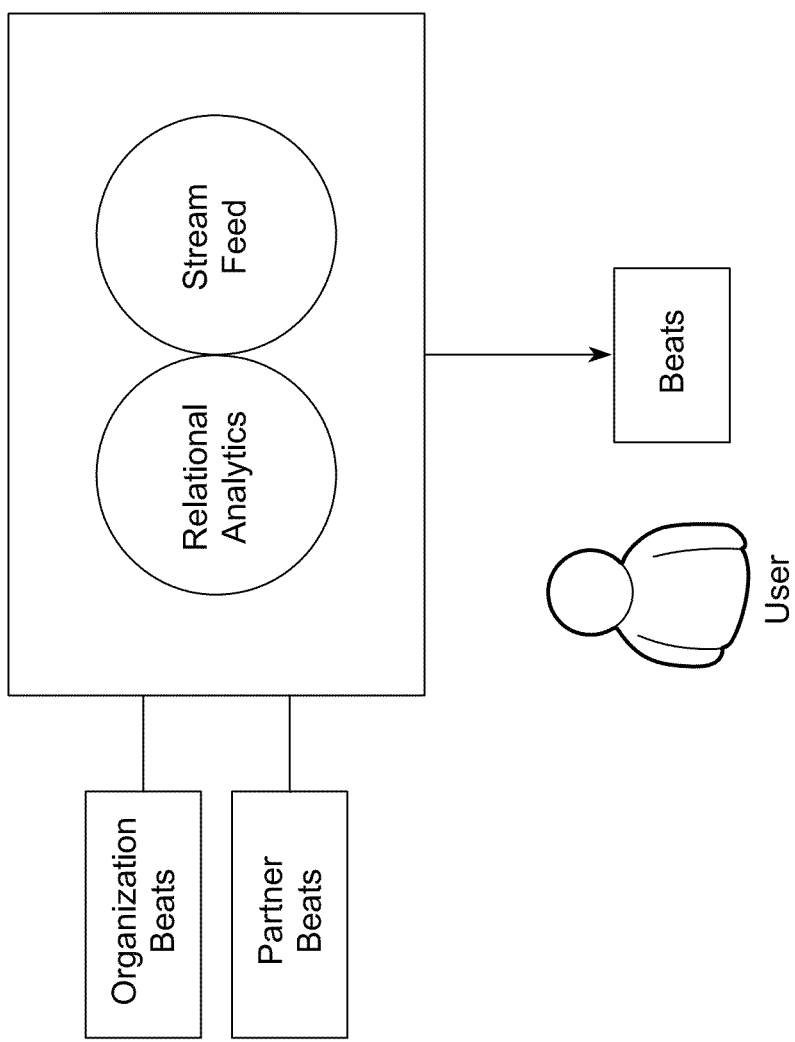
FIG. 11 illustrates example components involved in a session.

FIG. 11 illustrates example components involved in a sub-session, including communication coordination system components. The components in this example include a relational analytics system that defines the relationships of sub-sessions and parties, and that synchronizes the foregoing. A stream feed component manages when and to whom data is to be transmitted to, and when and with whom sessions or sub-sessions are to be initiated with. The components conduct sessions/sub-sessions with clients/organizations (e.g., with whom the user has initiated a contact with) and partners of the client/organization.

For example, when a user initiates a contact, the components initiate a session (which may extend over multiple voice sessions). A session may include a discovery sub-session (e.g., where a session/beat management system determines what the user wants via a menu item by the user or via an electronic form filled out by the user). Then one or more engagement sub-sessions may be conducted, where data is exchanged between the user and the session/beat management system.

Figure 12:
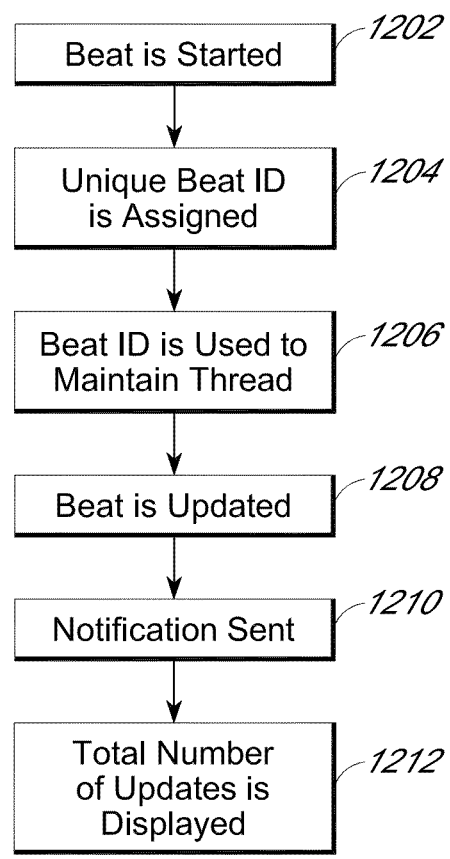
FIG. 12 illustrates an example sub-session management process.

FIG. 12 illustrates an example session management process. At state 1202, a session is initiated. At state 1204, an identifier is assigned to the session, which, at state 1206, is used to track/maintain a thread across multiple data and/or voice communications. At state 1208, the session may be updated based on information from another user/client/partner (e.g., a confirmation of a scheduled appointment, change in status of an order, etc.). At state 1210, a notification may be sent to the user providing, by way of example, information on the status of a session/request. At state 1212, the number of updates to the session (e.g., number of changes to the work flow) may be provided for display to the user.

Figure 13:
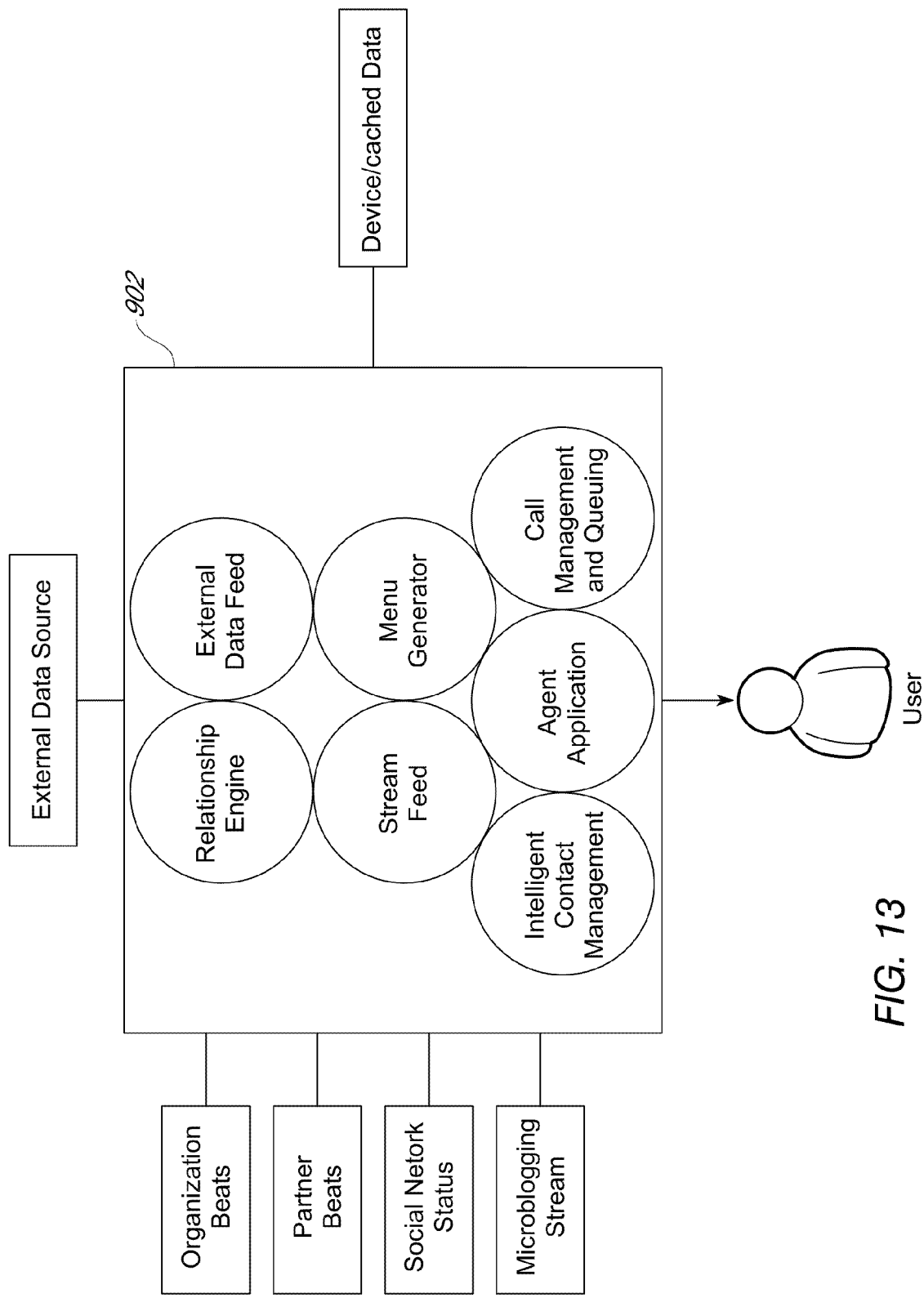
FIG. 13 illustrates example components involved in a sub-session stream.

FIG. 13 illustrates example components, including communication coordination system components, involved in a sub-session stream, including components discussed elsewhere herein. The illustrated components include a relationship engine, an external data feed (which receives static and dynamic data, including for example, traffic data, weather data, news, etc.), a stream feed, a menu generator (which generates a menu for a particular contact a user wants to contact), an intelligent contact management component (which prioritizes the order of contacts in a user's contacts listing based on extended information associated with the user and/or external feed information), a call management and queuing component (which synchronizes voice calls and data, and controls the routing of such voice calls and data), and an agent application which provides some or all of the user extended information for display to an agent of a party the user has initiated a contact with. The components receive client/organization sub-session information, partner sub-session information, social network status information regarding the user, microblogging streams, etc. Some or all of the data received by and/or provided by the communication coordination system may be cached in memory.

Figure 14:
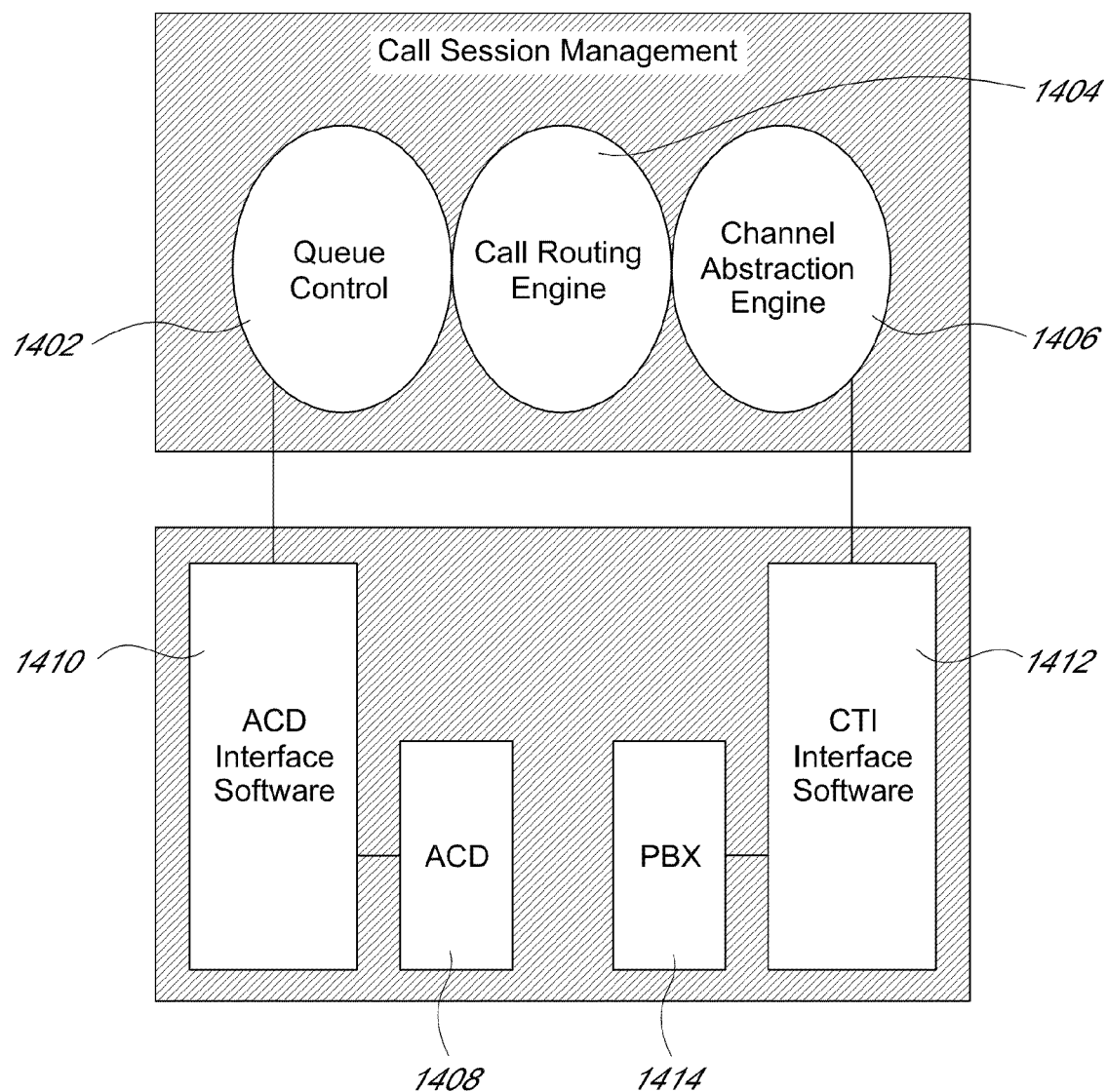
FIG. 14 illustrates example components involved in voice call processing.

FIG. 14 illustrates example components, including communication coordination system components, involved in voice call processing. The illustrated components include a queue control component 1402, a call routing engine 1404, and a channel abstraction engine 1406. The queue control component 1402 may queue incoming calls using one or more techniques, such as on a first-come-first service order basis (or round robin, longest idle and/or ring all style), unless queuing rules indicate otherwise. For example, if a caller was in the middle of a sub-session when the call was interrupted (e.g., where the caller was on a cell phone and the call was dropped), and the caller calls back within a predetermined period of time, the caller's call may be put at, or near, the head of the queue, even if calls from other users arrived before the post-interruption call was received and queued.

The call routing engine 1404 may route calls from the queue to a selected channel via the channel abstraction engine 1406 (which creates voice channels and call connections).

An advanced call distribution (ACD) component 1408 manages the queue control component via an ACD interface component 1410. For example, the distribution interface component may distribute calls in queued call in a linear priority, round robin, longest idle and/or ring all style.

Computer telephony interface (CTI) software 1412 may be used to enable interaction between a telephone system and a computer system, and interface with a pbx system 1414.

Figure 15:
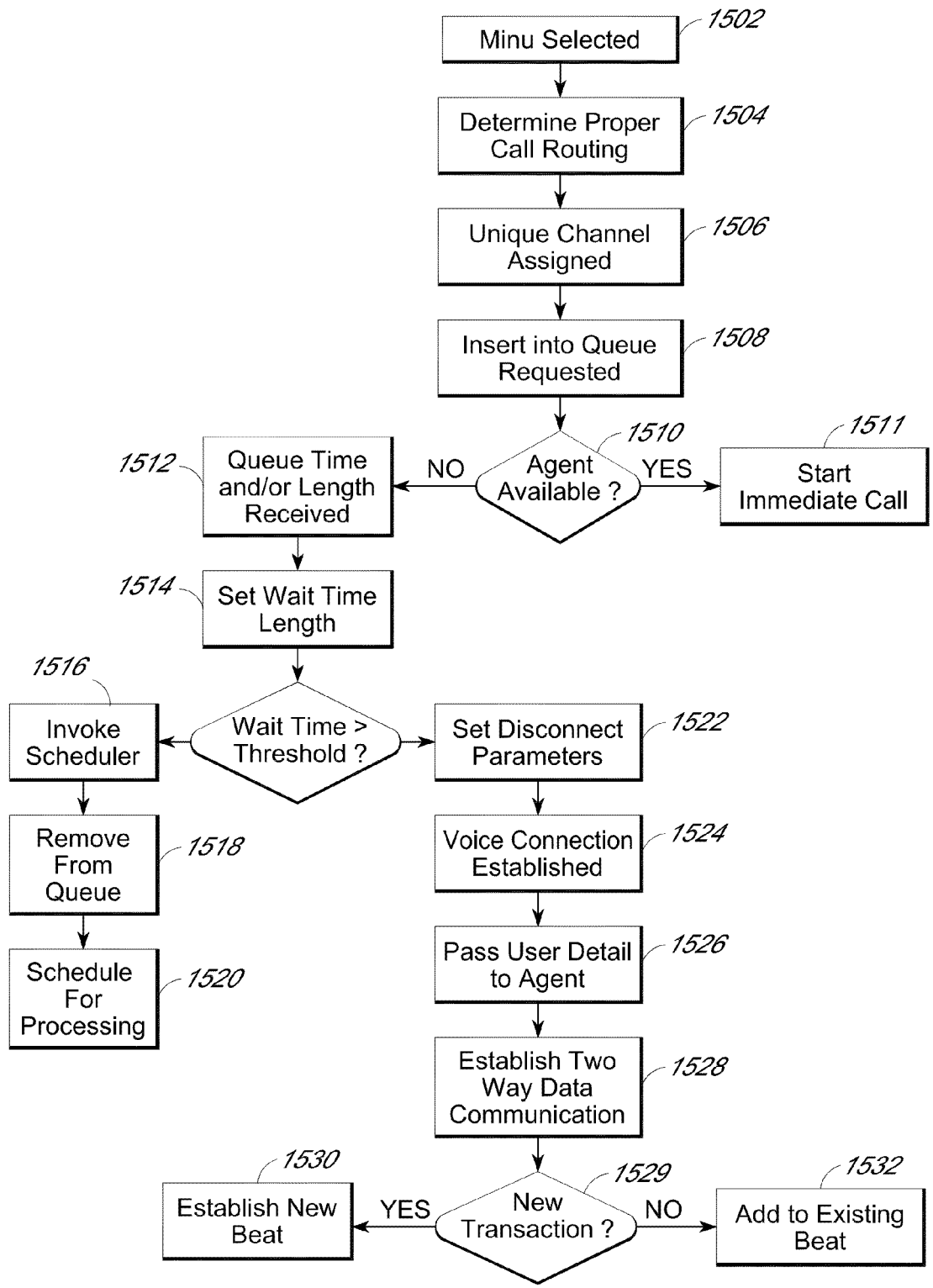
FIG. 15 illustrates an example voice call processing process.

FIG. 15 illustrates an example voice call processing process. As will be described, after a data session is initiated, a virtual voice call may be processed prior to the establishment of an actual voice call to thereby enable the actual voice call, if it occurs, to be appropriately timed and/or synchronized. That is, the process may assume that a voice call will occur even if the voice call later on turns out not to occur. At state 1502, a menu for a user contact is provided for display on a user device (e.g., a mobile telecommunications device, such as a cell phone). The user selects a menu item (e.g., a pre-specified query, such as what are you operating days/hours, an inquiry regarding the status of a claim, a sales item, etc.). At state 1504, a system determines the routing for a virtual voice call related to the selected menu item. At state 1506, a unique communications channel is assigned to the virtual voice call, which acts as a place holder for an actual voice call, which may or which may not later occur. At state 1508, the virtual call is inserted into a call queue. At state 1510, determination is made as to whether there will be a wait time until someone (or something, if the call is to be answered by an automated system) is available to take the virtual call. If there is someone available to take the call, at state 1511 an actual call is placed to the user device and the user is connected to a respective call recipient.

If not already queued, if a determination is made that there will be a wait time until someone will be available to take the virtual call, the virtual call may be queued. At state 1512, the estimated queue time/length until the virtual call will be answered may be determined or received. The system may apply one or more call handling rules related to the wait time/length. A wait time duration may be set at state 1514

For example, if the wait time is estimated to be a greater than a first specified threshold (e.g., greater than 5 minutes or other predetermined time period), the user may be asked (via a voice message, via an application user interface, via a web page, or otherwise) to schedule an appointment to speak with someone, and the scheduled appointment may be calendared for a selected person (or someone is a selected group) to call the user back at the calendared date/time. Thus, at state 1516 a scheduler may be invoked, the virtual call may be removed from the queue at state 1518, and the request may be scheduled for later processing at state 1520. Thus, rather than tying up actual telecommunications bandwidth having an established voice call, where the voice call will later be abandoned without any useful voice communication, the utilization of a virtual voice call allows a determination to be made as to whether it is appropriate to establish an actual voice call.

Optionally, a wait time may not be based or wholly based on whether someone is available to take the actual voice call. The wait time may be set so as to allow time to determine if the user may be provided with a requested service or information without the need for a voice call (e.g., from an automated response system or from another source, such as another customer).

By way of further example, if the estimated wait time is less than or equal to the first specified threshold, the user may be asked to wait until the user is connected via a voice call (and an estimated wait time may be provided to the user), and disconnect parameters may be set at state 1522. The system may collect and store session information (e.g., information provided by a user regarding a transaction, such as an insurance claim submittal). Thus, if an actual call is dropped, and then the user is reconnected via a subsequent call (which may be placed by the communication system calling the user, calling a designated call recipient, and bridging the calls), the user interaction with the contact may start at the point of the call was dropped, rather than at the beginning of the interaction. After the call is dropped, a user interface may be displayed to the user indicating that the user will be called back within a certain time period (e.g., within 30 seconds, 45 seconds, 1 minute, or other time period).

Optionally, disconnect parameters may specify one or more rules that may be applied with respect to a dropped call and a subsequent call with respect to a user. For example, the rule may specify that if the subsequent call is within a specified period of time after the original call was dropped, the subsequent call will connected to the same person the user was speaking with prior to the dropping of the call. If, instead, the user activates the menu item to reestablished the call after the specified period of time after the original call was dropped, the subsequent call will queued as a virtual call, and the process discussed above may similarly be repeated (e.g., the call may be placed at the end of the voice queue). However, the data session may be persisted from the original call to the subsequent call so that the interaction can begin substantially where it left off.

After the disconnect parameters are set, at state 1524 a voice connection is established between the user and the contact (e.g., a customer service representative of the contact). At state 1526, extended information and/or external information may be provided for display to the contact on a contact terminal. At state 1528, two way communication is then established between the user and contact. A determination is made at state 1529 as to whether the call relates to a new transaction, or is a continuing part of a previously initiated transaction. If the call is related to an existing transaction, at state 1532 the call is assigned to an existing sub-session (e.g., the sub-session identifier of the existing sub-session is associated with the call). If the call is not related to an existing transaction, at state 1530 a new sub-session is established, and the call is assigned to the new sub-session (and associated with the identifier of the new sub-session).

Figure 16:
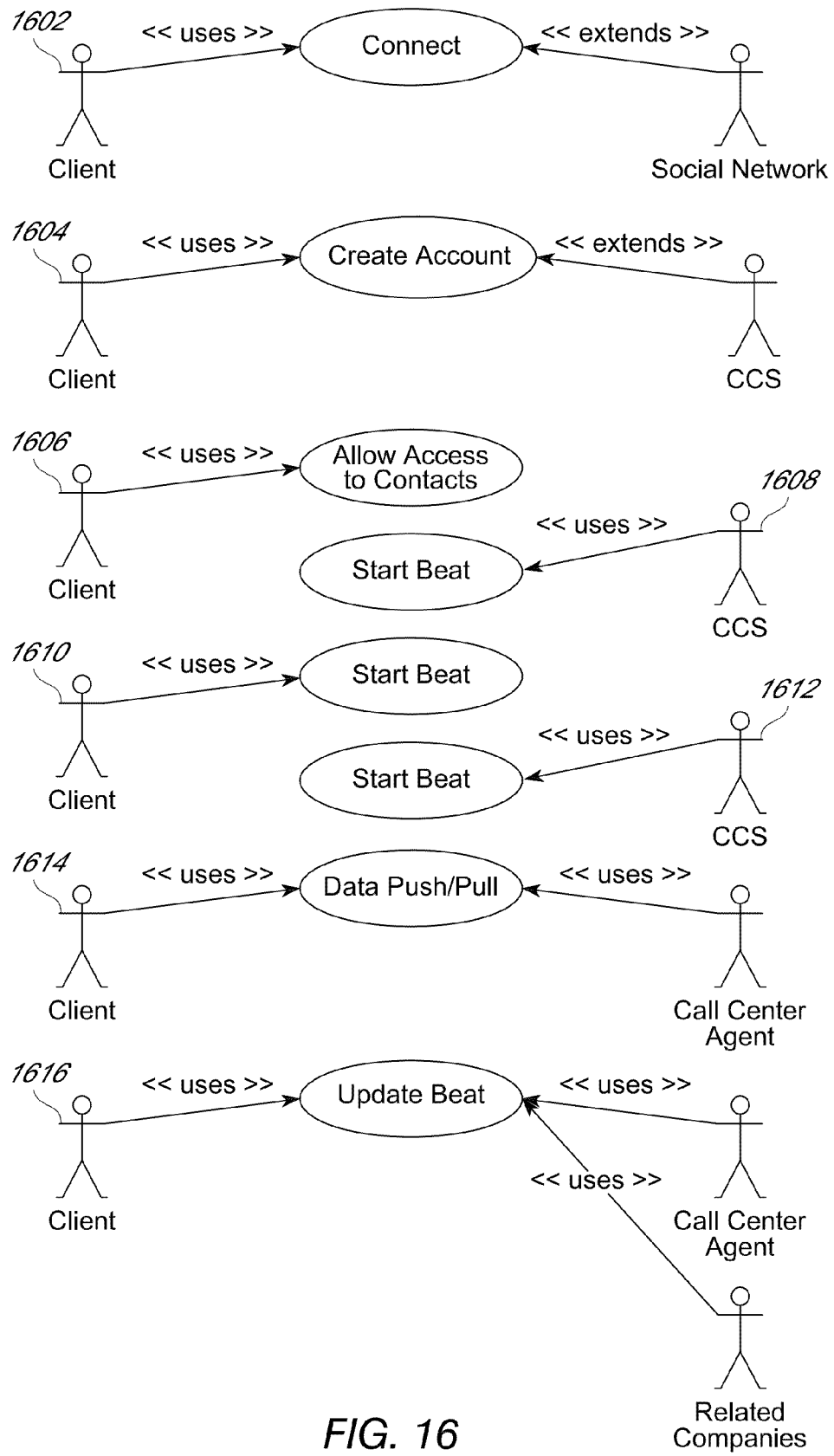
FIG. 16 illustrates an example call handling process.

FIG. 16 illustrates an example call handling process. At state 1602, a user indicates that the user would like to use the services provided by the communication coordination system (CCS) illustrated in FIG. 1. The indication may be provided via an application embedded in a social network site webpage or otherwise. If an account has not yet been established for the user the user may establish an account using the user's existing social network site account. This enables the communication coordination system to obtain access to some or selected portions of the user's social network site data and feeds (e.g., the user's social graph). Alternatively At state 1604, the user may create a new account without utilizing their social network or other account.

At state 1606, the user may allow the communication coordination system access to the user's contacts (e.g., from the contact data store on the user's phone, Microsoft® Outlook®, Google's Gmail®, the social network site, etc.). At state 1608, the communication coordination system may utilize the user's contact and social network site information to identify and determine relationships the user has or may have with other individual users or business entities. Further, the communication coordination system may use the foregoing information to define matches and groups to which the user belongs or which may be suitable for the user. The groups may be defined as users that are customers of a particular business, that live in a particular geographic area, that are connected via a social networking site, etc. Such grouping information may enable an entity, such as a service provider, to target information relevant to the group. For example, if there is a tornado warning in a specific geographic area, an insurance provider may transmit a tornado warning notification to its customers within the geographic area (and not to users that are not in the affected area, who would be relatively uninterested in the tornado warning).

At state 1610, the user initiates a call to an entity, such as a service provider (e.g., by selecting an appropriate menu item or contact icon presented on the user's telecommunication device, as similarly discussed above), and the system initiates a sub-session and assigns a corresponding sub-session identifier. At state 1612, the communication coordination system registers the call. At state 1614, data is pushed to or pulled from the user (e.g., via an application hosted on the user telecommunication device) by a second user (e.g., a call center agent of the entity to which the user initiated contact) via the second user's system.

At state 1616, a third user related to the second user (e.g., where the third user provides a complimentary service to a service being provided by the second user) is added to the sub-session and optionally the call by the second user. For example, the second user may be a medical insurance provider and the third user may be a medical services provider (e.g., a physician, dentist, podiatrist, pharmacy, etc.).

Figure 17:
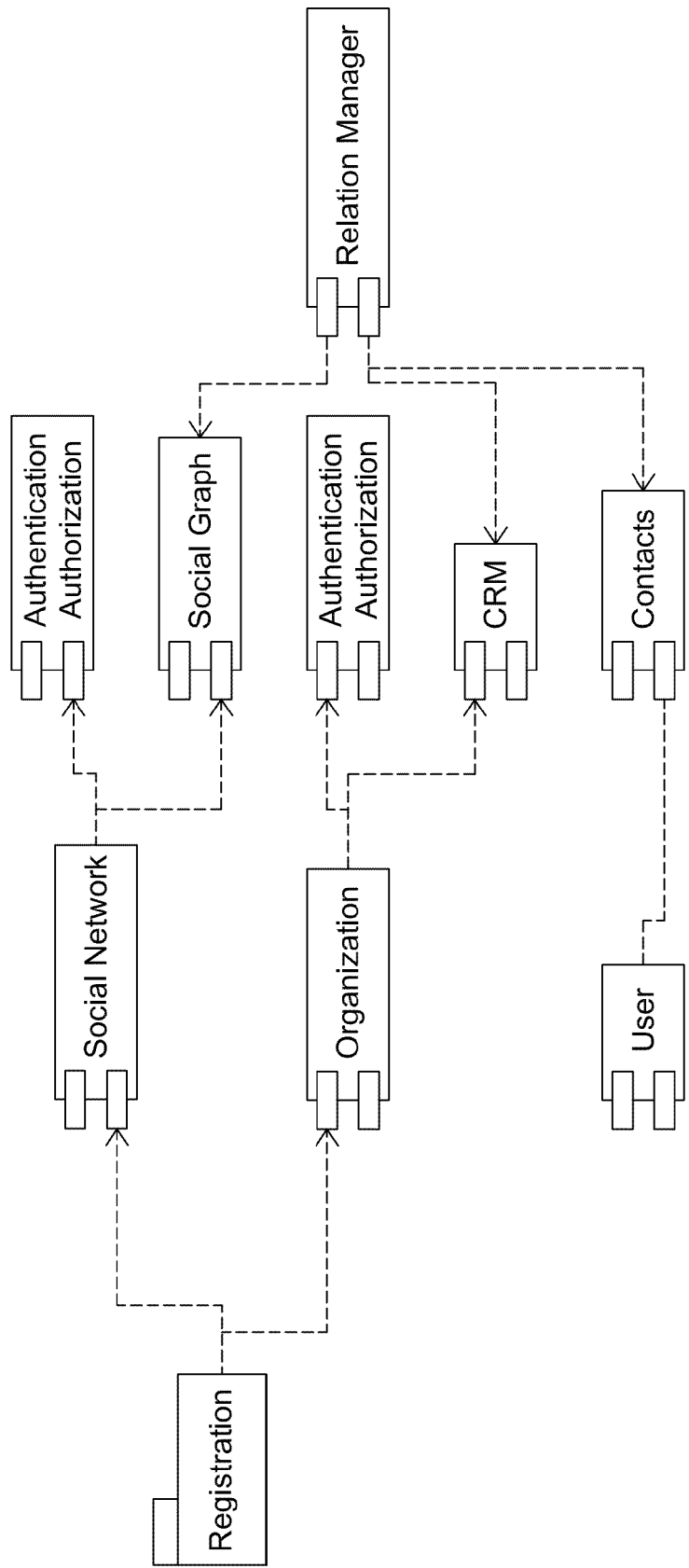
FIG. 17 illustrates an example data flow for a user registration process.

FIG. 17 illustrates an example data flow for a user registration process. Authentication of a registering user may be provided via a social network site, as similarly described above. Authentication may also be provided for one or more companies the user has a relationship with using an authorization technique specified by or acceptable to the companies (e.g., where different companies may require different information in order to authenticate a user). A social graph (indicating who the user interacts with or has a relationship with) of the user may be obtained from one or more social networking site. In addition or instead, a user may be authenticated via an organization, such as a service provider of the user (e.g., an insurance provider for the user). The user may be asked for permission to receive information provided by the service provider. A customer relationship management (CRM) system may provide information (e.g., from a customer list) regarding the user from the service provider. The user may provide access to the user's contact database, as similarly described above.

A relationship manager may access the social graph, CRM system, and user contacts in order to authenticate the user, identify relationships of the user (e.g., with other individual users and/or service providers), user status, and/or user interests, as similarly discussed above with respect to the relational analytics system.

Figure 18:
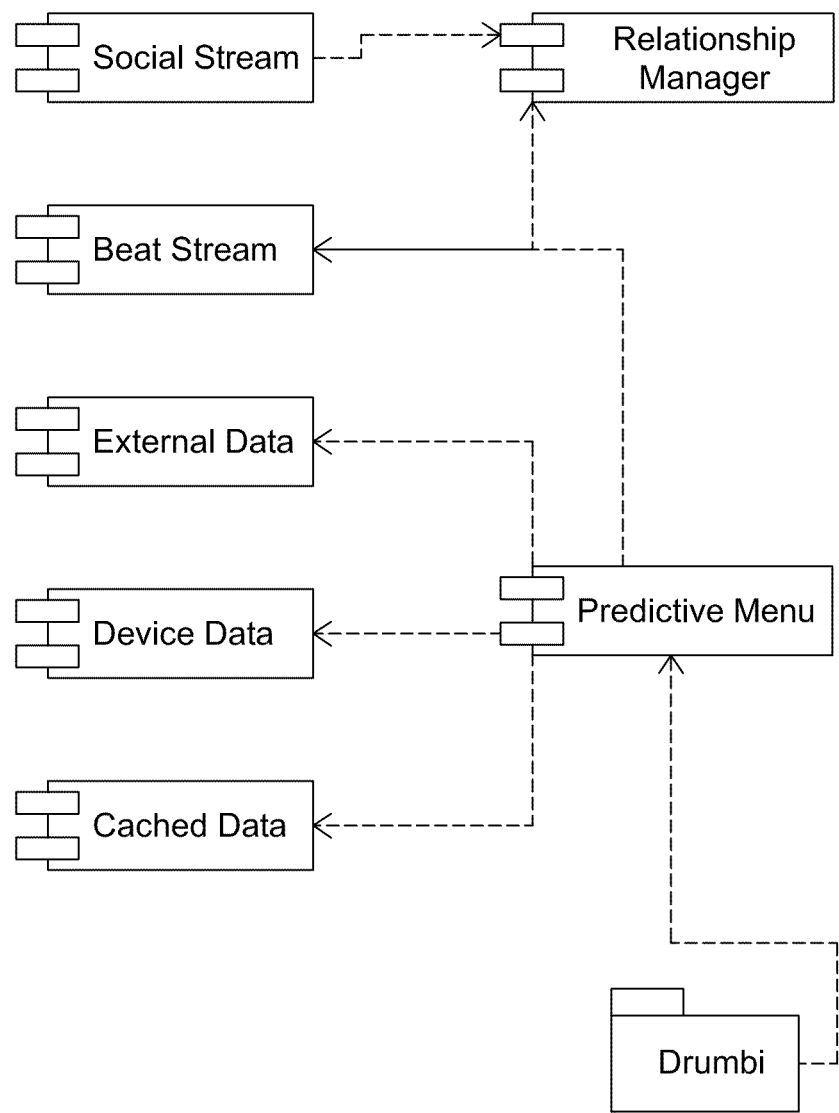
FIG. 18 illustrates an example data flow for an initialization process.

FIG. 18 illustrates an example data flow for an initialization process. Data relevant to a user (e.g., from a social network system, a microblogging system, user contacts, a sub-session stream, etc.) is received by a relationship manger. The relationship manager uses the data to identify relationships of the user (e.g., with other individual users and/or service providers), user status, and/or user interests, as similarly discussed above. A predictive menu component uses data from a variety of sources (e.g., external data, such as weather and traffic data, user device data, such as time, location, and movement data, popular topics/menu items of other users, and data previously cached), to generate, modify, and/or access a menu relevant to the user's current status or need. The menu may be presented to the user via a user device. For example, the predictive menu component may anticipate a question from a user or information that is likely to be of interest to the user, and automatically include the answer or information of interest in the user interface provided for display to the user.

Figure 19A:
FIGS. 19A-GG illustrate example user interfaces.

FIGS. 19A-FF illustrate example user interfaces. FIGS. A-Z illustrate user interfaces presented via an application hosted on mobile communication device (e.g., a cellular phone). FIGS. 19AA-FF illustrate user interfaces presented via a browser on a desktop terminal. Other user interfaces may be used in addition or instead. However, the user interfaces can also be presented on other devices via other applications, such as desktop or laptop computers, pad computers, networked appliances, interactive televisions, etc.

Figure 19B:
Figure 19C:

FIG. 19A illustrates an account initiation user interface. In this example, the user can create an account by activating a social network menu item (Facebook®). If the user already has an account, the user can sign in by activating a sign-in control. If the user activates the sign-in control, the interface illustrated in FIG. 19B is presented, including an email field and a password field. The user can enter the user's email and password, and activate a sign-in control to sign in. If the user is creating a new account, the user interface illustrated in FIG. 19C is presented. The user may enter the requested user information (e.g., user email, first and last names, phone number, and a password), and activate a sign-in control to provide the information to a remote system, which will then store the user information in memory.

Figure 19D:

FIG. 19D illustrates an example user interface via which the user can view and grow the user's network (e.g., as managed by the communication coordination system discussed above or other system). The illustrated user interface presents (e.g., using tiles with images, text listings, or otherwise) people, companies, or other entities the user may know (e.g., as identified using relationship analytics as discussed above), and the user can invite one or more of the foregoing to connect to the user. The user interface may also include other users that the user is already connected to via the communication coordination system or otherwise. The user may initiate a communication with a contact by activating a respective control (the "Drumbi" control in this example).

The ordering of the tiles or listing of connections may be dynamically changed based on one or more parameters. For example, connections that are geographically close to the user's current location (e.g., as determined via the user's mobile device location information) may be displayed relatively higher up or more prominently than those that are geographically far way, other factors being equal. Other example factors may include some or all of the following and/or other factors:

frequency of interactions with connections, wherein the more frequent the interactions the higher or otherwise more prominently the connection is displayed;
time of the day;
day of the week;
birthdays of connections wherein a connection that is having a birthday is higher or otherwise more prominently displayed;
calendared appointments, wherein the more time proximate the appointment the higher or otherwise more prominently the connection is displayed;
etc.

Different weightings may be used for different criteria.

Figure 19E:

FIG. 19E illustrates an example navigation interface via which a user can view the user history (e.g., past and current sessions, session interactions, session status, etc.), alerts (e.g., notification from the communication coordination system, updates to sub-sessions, etc., which may also include a link to a related session in the user history), settings (setup options regarding the application, the user's account, etc.), and information (e.g., regarding the services provided via the communication coordination system, the revision number of the application, legal notices, etc.).

Figure 19F:
Figure 19G:

FIG. 19F illustrates an example "history" user interface presented when the user activates the history control illustrated in FIG. 19E. This example lists who the user has communicated with, whether the communication was initiated by the user or the other party, data (e.g., text or multimedia) messages associated with the communication, and the date and optionally time of the communication. FIG. 19G illustrates an example "alerts" user interface presented if the user activates the alerts control illustrated in FIG. 19E. This example lists the alerts received by the user, who sent the alerts, messages (e.g., text or multimedia messages) associated with the alerts, and the date and optionally time of the alerts.

Figure 19H:

FIG. 19H illustrates an example menu. This example menu is configured for person-to-person communication (as opposed to person-to-company/service provider). The menu may have been customized for the user based on the user's profile, device data, previous/recent communications/menu items of the user, popular topics/menu items of other users, etc. For example, if the user recently submitted a query regarding flight information to another user, that topic may be displayed as a top or upper menu item in a recent topics area. Popular topics/menu items may be displayed in order of their popularity in a popular topics area. A search field is provided via which the user can search for or add additional menu items/topics. This search field enables the user to access items or menu items that are not otherwise displayed.

Figure 19I:
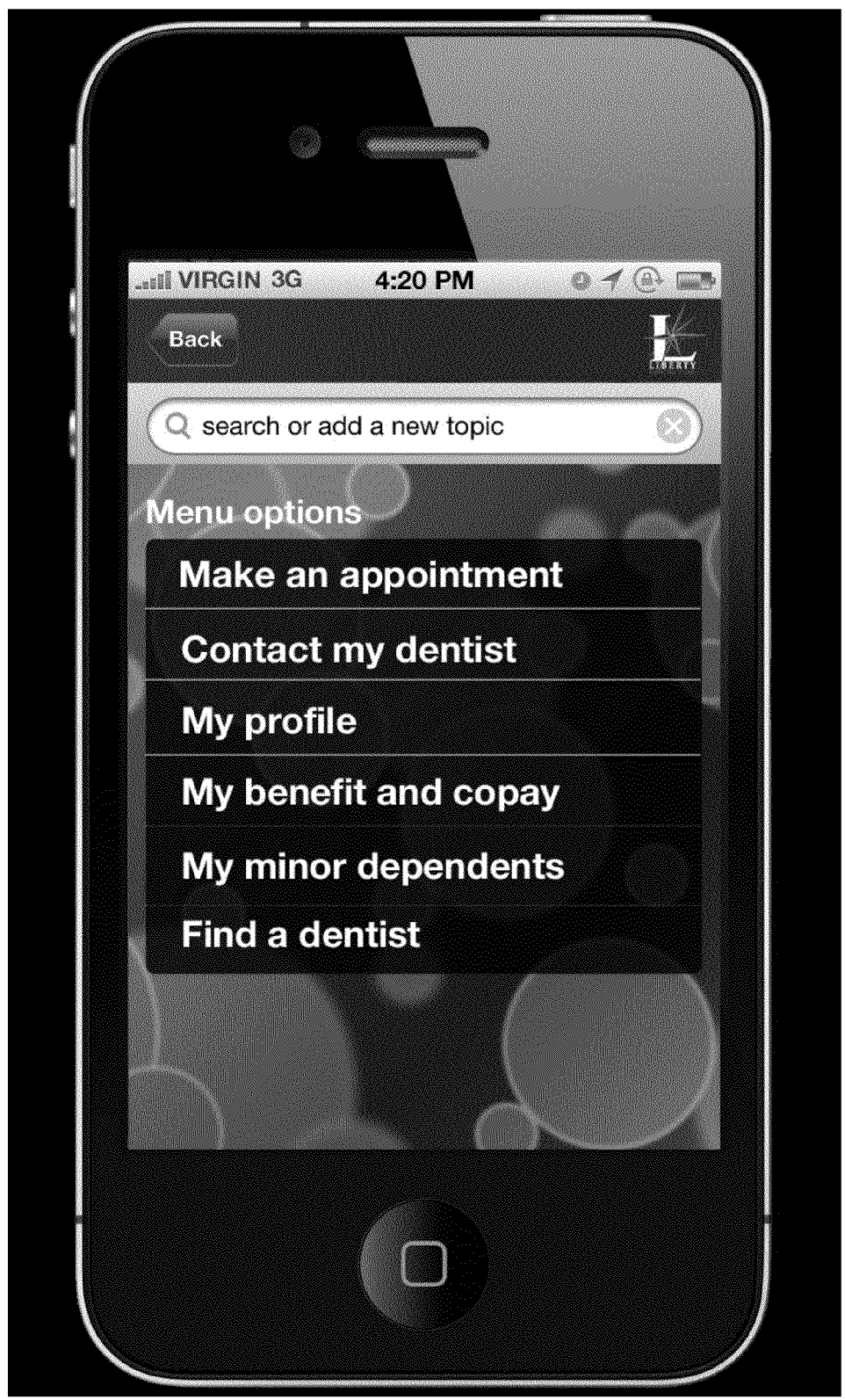

FIG. 19I illustrates another example menu. This example menu is configured for person-service provider communication. The menu may have been customized for the user as similarly discussed above. The illustrated example relates to a medical insurance provider contact. The menu options include "make an appointment", "contact my dentist", "[let me see] My profile", "[what are] my benefits and co-pay", "[these are] my minor dependents", "find a dentist". As similarly discussed above with respect to FIG. 19H, a search field is provided via which the user can search for or add additional menu items/topics.

Figure 19J:
Figure 19K:

FIG. 19J illustrates an example user interface provided for display to the user if the user elects to utilize the search field (e.g., illustrated in FIGS. 19H and 19I). FIG. 19K illustrates a predictive entry screen that predicts the item the user is searching for based on the initial letter(s) entered by the user, recent searches by the user, popular searches by users in general, the user interface the user was viewing when the search field was accessed, and/or other data discussed herein.

Figure 19L:
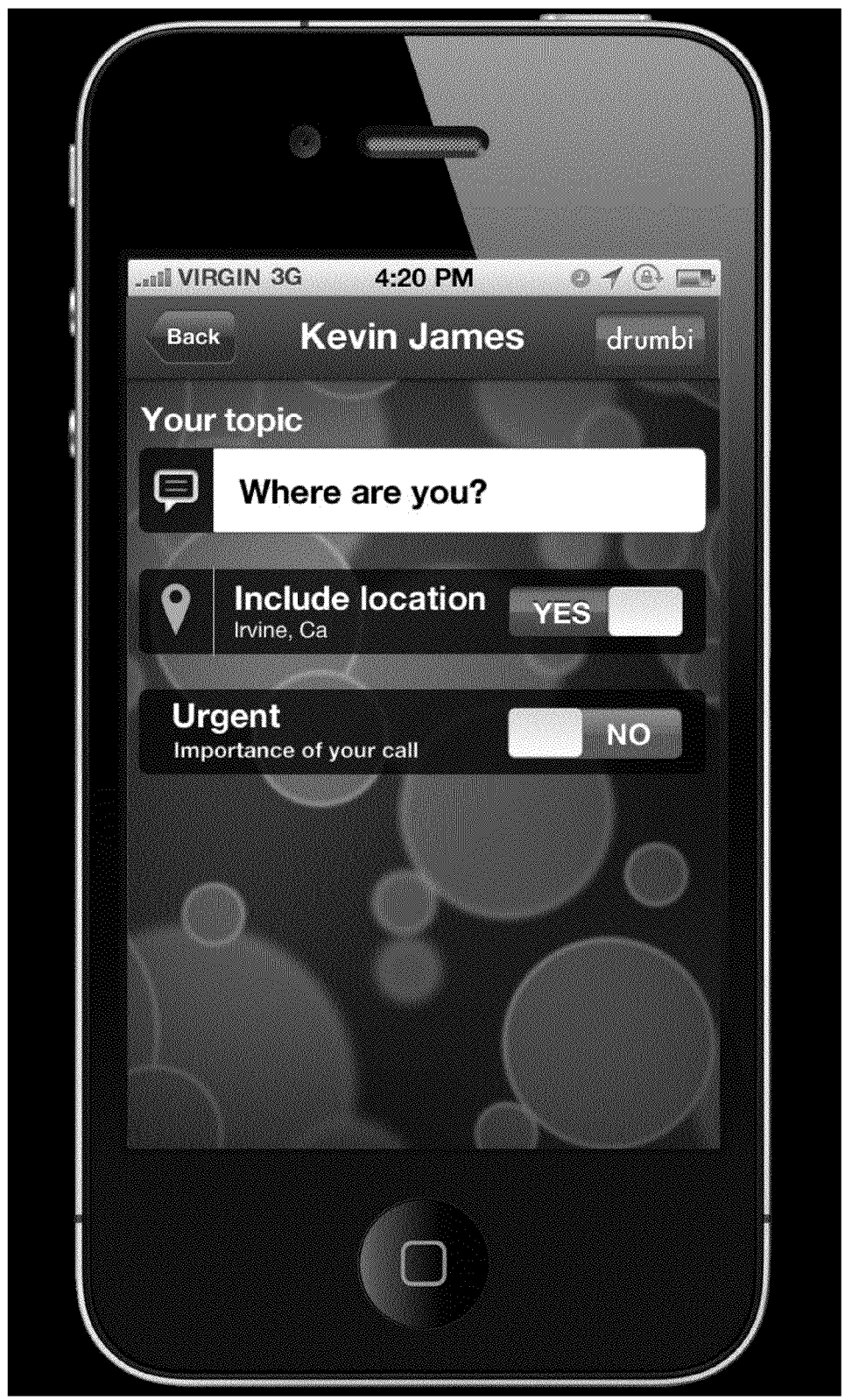

FIG. 19L illustrates a user interface via which a user may provide information and queries to be presented to recipient user (e.g., in conjunction to a voice call). This user interface may be presented in response to a user selected a menu item, such as the "Where are you" menu item illustrated in FIG. 19H. Controls are provided via which the user can specify whether the user's location information (e.g., which may be based on the current location of the user as determined by the user's device, such as by using GPS) should be presented to the recipient user. The user can also indicate the urgency of the call via an urgent control.

Figure 19M:

FIG. 19M illustrates a user interface presented to the recipient via the recipient's device. This user interface corresponds to the information and queries illustrated in FIG. 19L. The user interface includes the message "Where are you?", indicates that matter is urgent, identifies the user initiating the communication, and the location of the user initiating the location. Certain indicators are optionally provided (S, R, V, A, D), that provide the status of the data message and/or associated call, as follows:

S=send
R=received
V=viewed (by recipient)
A=answered
D=call denied

In addition, fields are provided via which the recipient can ask the sender questions. By communicating via text, the need for a voice call may be obviated.

Figure 19N:

FIG. 19N illustrates the user interface of FIG. 19M, except the status has been advanced to "R" (received).

Figure 19O:

FIG. 19O illustrates the user interface of FIG. 19N, except a "no answer" notification is presented, indicating that the associated call has not been answered.

Figure 19P:

FIG. 19P illustrates the user interface of FIG. 19N, except the status has been advanced to "V" (message has been viewed by recipient).

Figure 19Q:

FIG. 19Q illustrates the user interface of FIG. 19P, except a "no answer" notification is presented, indicating that the associated call has not been answered.

Figure 19R:

FIG. 19R illustrates the user interface of FIG. 19P, except the status has been advanced to "A" (message has been answered by recipient).

Figure 19S:

FIG. 19S illustrates the user interface of FIG. 19R, except the text "Answered" is displayed, indicating that the call has been answered.

Figure 19T:

FIG. 19T illustrates the user interface of FIG. 19S, except only the icon "A" indicates that the call has been answered, rather the word "Answered."

Figure 19U:

FIG. 19U illustrates the user interface of FIG. 19T, except the status has been advanced to "D" (call denied), and the text providing the reason the call is denied ("Sorry, can't talk"), where the text may have been selected or entered by the recipient.

Figure 19V:

FIG. 19V illustrates a user interface on a message recipient's device, which may be presented prior to initiation of a voice call from an initiating user to the recipient. The message appears as a pop-up on the user's device indicating that the initiating user (who is identified in the pop-up) has designated the potential call as urgent, and with the message "I need your help."

Figure 19W:

FIG. 19W illustrates a user interface of a called party that displays, as an enhanced dynamic caller identifier, the caller name, the actual location of the user as determined via the user's calling device (e.g., via GPS), a caller designated urgency designation, and a text message entered by the caller or selected by the caller from a menu. Controls are provided via which the called party can accept the call or can refuse the call, with an "unavailable" designation.

Figure 19X:

FIG. 19X illustrates a user interface of a called party that displays forwarding controls via which a called party can forward the call to one or more pre-designated numbers/destinations or via a manually entered number. Controls are provided via which the called party can accept the call or can refuse the call with an "unavailable" designation.

Figure 19Y:
Figure 19Z:
Figure 19A:
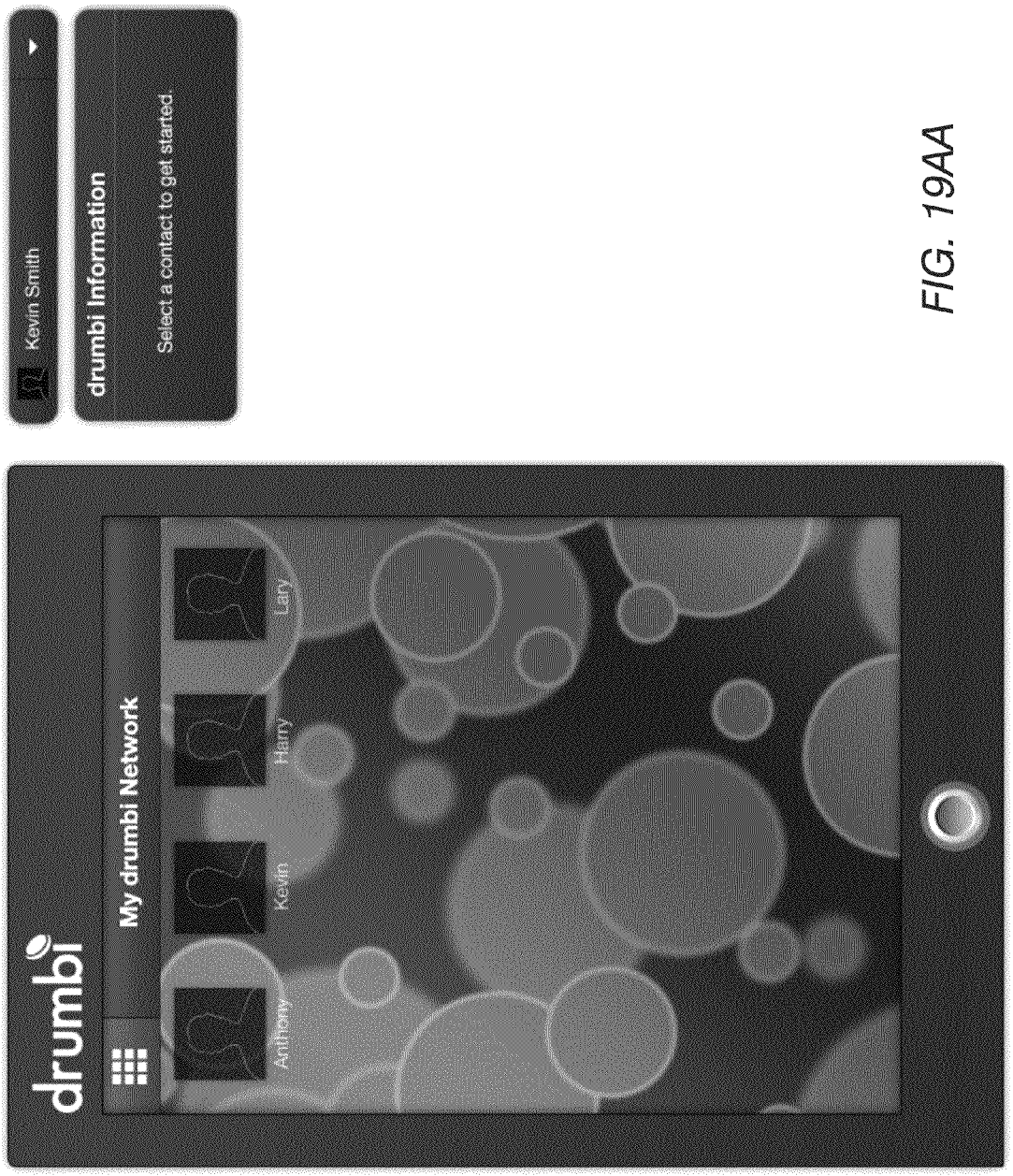
Figure 19B:
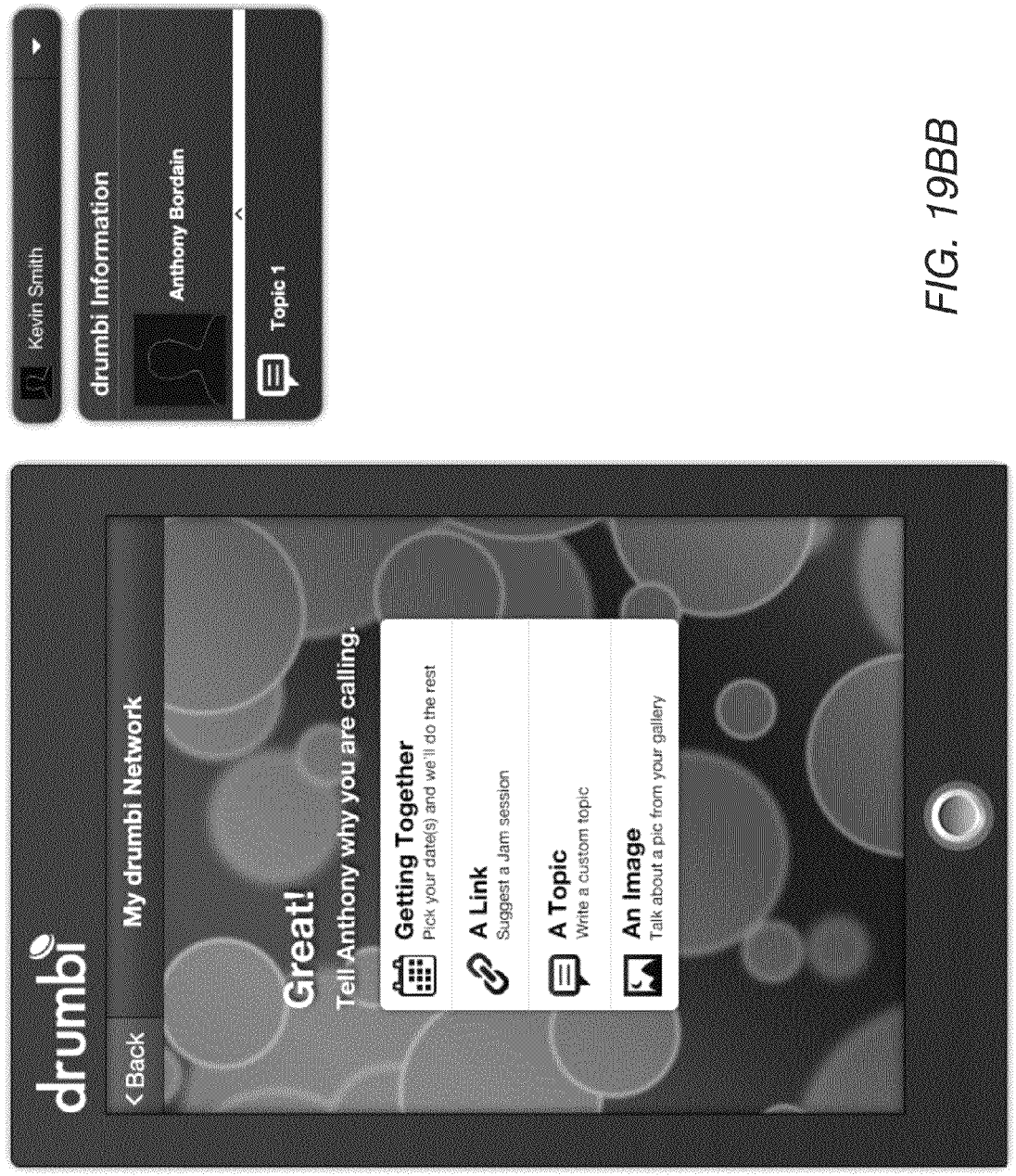
Figure 19C:
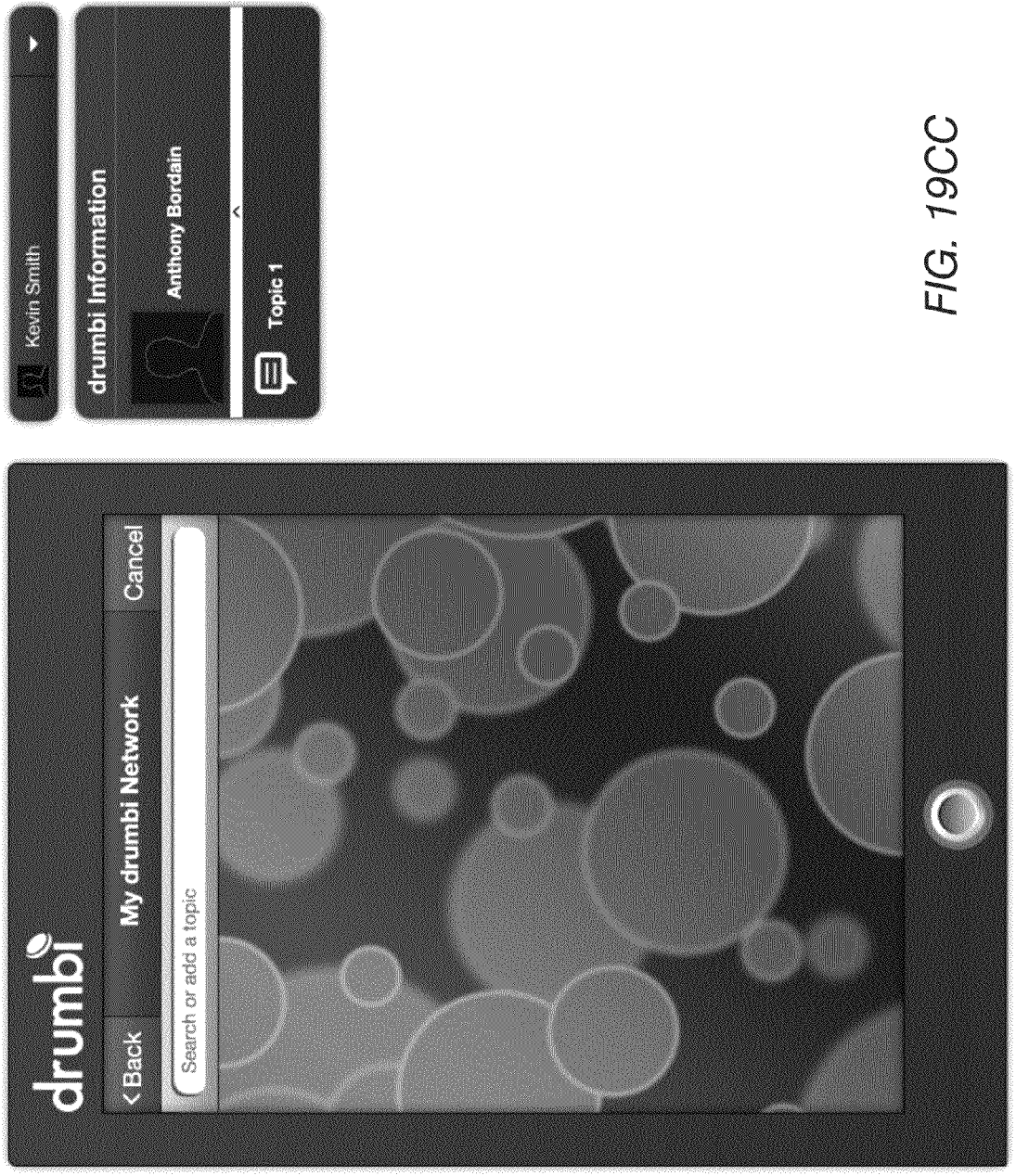
Figure 19D:
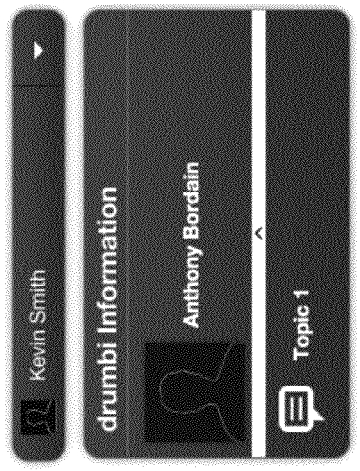
Figure 19D:
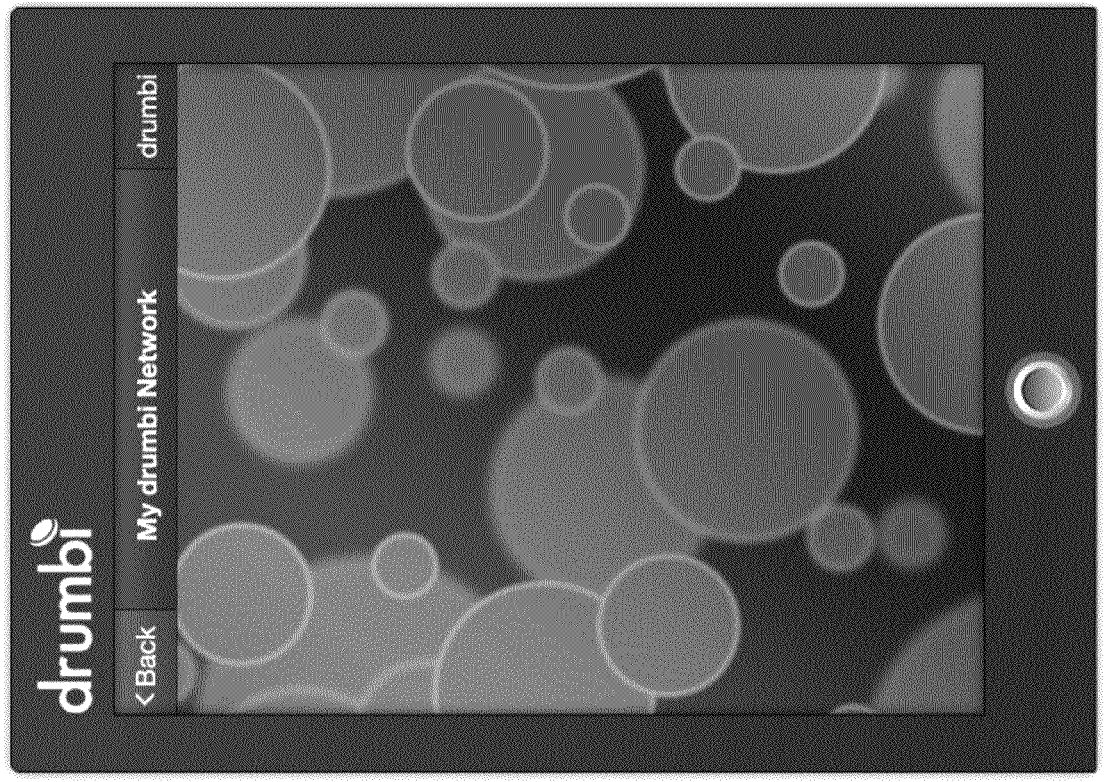
Figure 19E:
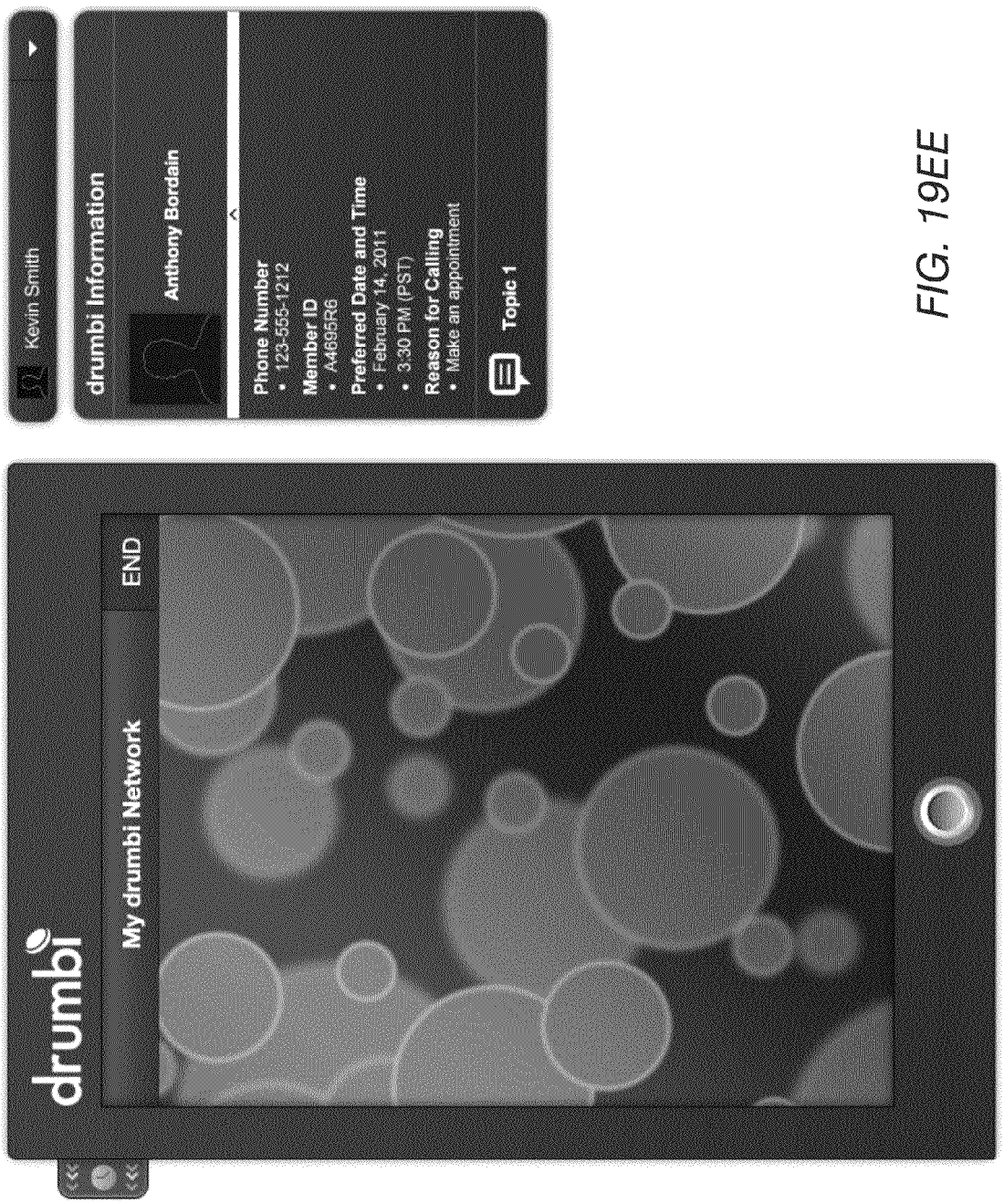
Figure 19F:
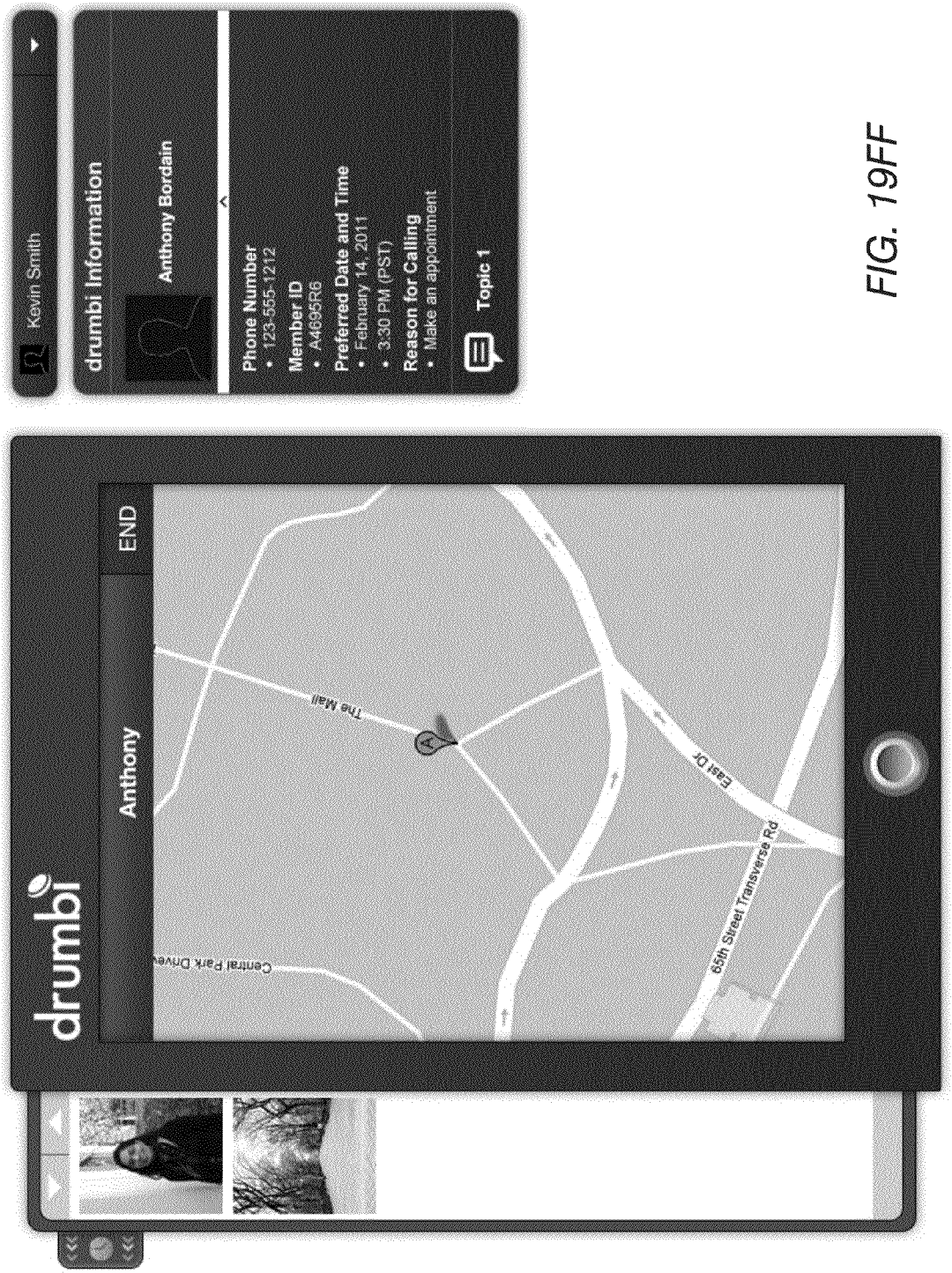
Figure 19G:
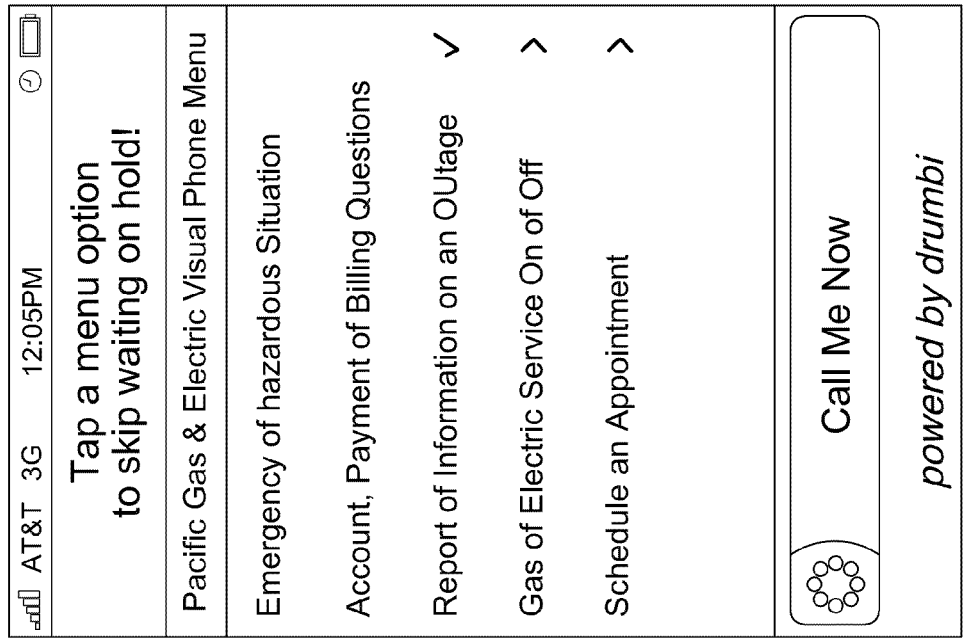

FIG. 19Y illustrates a user interface of a called party (e.g., an insurance agent) via which the called party can select or enter a reason for denying a call. FIG. 19Z illustrates a user interface of displaying a reason for denying the call.

FIG. 19AA illustrates an example user interface displaying connections of the user via icons displaying respective images of the connections. The user can initiate a data-coordinated call by selecting a respective icon.

FIG. 19BB illustrates an example user interface displaying a menu of items that will be included in a message that will be sent to the called party prior to the call. The user can select "getting together", which will cause an interface to be presented via which the user can select one or more dates on which the user is available to get together with the called party. This will cause a message to be transmitted to the called party with the available selected dates. The called party will then be able to select a date from the plurality of dates for the get together. The acceptance of the date will then be transmitted back to the caller.

If the user selects the link menu item the link entered by the user may be sent (e.g., where the user wants to share a link with the called party).

If the user selects the "a topic" menu item, the user can specify a custom topic, which will then be communicated to the called party.

If the user selects the "an image" menu item, the user can select an image from the user's electronic collection of images to be included in the message.

FIG. 19CC illustrates an example user interface via which the user can search for or add a topic. This interface is similar to the interface of FIG. 19H.

FIG. 19DD illustrates an example user interface. This interface is similar to the interface of FIG. 19L.

FIG. 19EE illustrates an example user interface displaying to the called party the user's name, phone number, member ID, preferred date and time for scheduling an appointment. This user interface may be displayed during the voice call.

FIG. 19FF illustrates the example user interface of FIG. 19EE, including images sent by the user to the caller, a map of the meeting place for the appointment (in addition to the user's name, phone number, member ID, preferred date and time for scheduling an appointment). This user interface may be displayed during the voice call and may display information from partner organizations of the called party (e.g., from an insurance company or other source).

In certain situations, such as in certain friend-to-friend calls, a user may initiate a data/voice session to a mobile communication device, such as a cell phone, of another user that does not have an application specifically configured to receive contextual data/voice communications. In certain embodiments, for example, a calling user may access an application hosted on the user's mobile communication device and select an entry corresponding to the friend. A user interface may be presented including a text field and/or menu entry via which the caller can specify the subject or context of the call. Once the user has provided such context, the user can activate a completion control, and a communication is directed to the communication system, including the context information. If the communication system determines that called party does not have the installed application specifically configured to receive contextual data/voice communications from the communication system (e.g., based on an account record associated with the called party), the communication system may configure an SMS or MMS message including certain limited extended information (e.g., the user's name and the subject provided by the user), and may include "accept" and "reject" control/links via which the user can indicate whether the called party is willing to accept a call from the user or rejects the call from the user. If the called party activates the "accept" call link, the called party's mobile device's browser may be opened to a webpage associated with the communication system, wherein the webpage by provide some or all of the functionality discussed above and may mimic in whole or in part the interfaces presented via the app discussed above and illustrated in FIGS. 19A-Z, and a voice call may be established between the called party and the caller (e.g., by placing a call to the caller device and the called party device and bridging the calls). If the called party activates the "reject" call link, the rejection indication may be provided to the caller and the session may be terminated.

If a determination is made that the called party's device is not capable of accepting such "accept" and "reject" links (as determined from functionality associated with the model number of called party's mobile device), the communication system may configure an SMS or MMS message including certain limited extended information (e.g., the user's name and the subject provided by the user), and may include instructions to text back a "1" (or other text) to accept the call, and a "2" (or other text) to reject the call. If the called party text backs a "1", the called party's mobile device's browser may be opened to a webpage associated with the communication system, wherein the webpage by provide some or all of the functionality discussed above, and a voice call may be established between the called party and the caller (e.g., by placing a call to the caller device and the called party device and bridging the calls). If the called party activates text back "2", a rejection indication may be provided to the caller and the session may be terminated.

In certain embodiments, a Short Message Service (SMS) or a Multimedia Messaging Service (MMS) may be used to access, via a mobile device (e.g., a cell phone or other SMS or MMS enabled device), call menus disclosed herein, thereby obviating the need to install an app on the mobile device in order to access such menus. For example, in certain embodiments, a user can send an SMS message from the user's mobile device to a phone address associated with a business the user wants to contact via a voice call. The communication system accesses and transmits to the user mobile device one or more calling menus (e.g., a phone tree menu) for the business. The menus can be provided and displayed both as text and/or as a link (e.g., a URL) to network resource such as a web page or a mobile web page, which when selected by the user, causes the mobile device browser to access and display the menus.

In an example embodiment, the process of using such messaging services may be performed as follows:

The system assigns a phone address (e.g., a phone number or a VoIP address) to an entity, such as an existing business. Alternatively, the business can provide the system with an existing phone address associated with the business.

The business publishes the phone address (e.g., via their Web site, online advertising, online phone directories, emails, SMS or MMS messages, physical mailings, QR codes and/or other channels).

A user (e.g., a customer or potential customer) finds the phone address and calls it.

An automated voice response system (or a human operator) audibly provides the user with the option to listen to the call menus, or to receive the call menus via SMS/MMS. The user may select the desired option via a verbal instruction or a key press (e.g., which generates a DTMF tone). If the user elects to hear the call menus, the call is transferred to the appropriate business phone number and the user's call may be handled using the business's conventional process (e.g., the user is initially connected to the business's IVR (interactive voice response system), which guides the user via an audible phone tree menu until the user selects the desired person or department to speak with).

If the user elects to have the menus sent via SMS/MMS, a message, such as a text message is sent to the caller's mobile device, with a callback link (e.g., a 1-click callback link). The system may also receive the user's calling phone address via call signaling information (e.g., callerID) received when the user called the published phone address associated with the business. The system may store the user's phone address as part of the current session and later access and utilize the phone address to direct SMS/MMS messages to the user's mobile device and/or to place calls to the user's mobile device. Optionally, in addition or instead, the user may be requested to submit a callback number/SMS destination address during the call via a data session, as discussed in greater detail below.

The user clicks the link, and the user's mobile device invokes a mobile web session, wherein the mobile device's browser accesses and presents call menu options (e.g., a list of different departments, services, or people, such as Sales, Service, Returns, Claim Status, Directions, etc.). Optionally, a menu may have an application attached to it as a web page (or a mobile web document) where the user can select options from a form or request/provide additional information. Then, the three-way call discussed below is placed, the items selected from the application may be transmitted to the agent as data or read to the agent using text to speech technology.

The user then selects a call menu option (e.g., by touching the menu option if the user's mobile device has a touch screen) and a call initiation control, which is received by the communication system.

A notification is presented on the user's mobile device indicating that the user will be receiving a call shortly corresponding to the select menu option.

The communication system receives the selection transmitted from the user's mobile device and begins the call process.

A three-way call is placed via the communication system to the business, wherein the call is directed to the department, service, or person corresponding to the user's menu selection, thereby automatically "navigating" the call tree based on the callers selection. The system may direct the call to the user's mobile device using the phone address obtained from call signaling information received during the user's earlier call to the business's phone address. Optionally, instead, the user may be requested to submit (e.g., type in or speak) a callback number via a user interface presented on the user's mobile device (e.g., which may be presented in response to the user activating the menu option). The callback number may then be transmitted to the communication system. Alternatively, the system may instruct the mobile device of the user to dial the phone address associated with the menu selection.

When an agent (or other personnel associated with the business) answers the call, the communication system plays a message to the agent regarding the call and providing an instruction on how to connect with the user (e.g., "Your customer is calling via the Drumbi™ communication service. Press 1 or say 'accept' to accept."). Alternatively through voice recognition the system will detect when an agent has answered the call.

When the agent provides the acceptance instruction (e.g., by pressing the appropriate keypad button or by providing the appropriate verbal command), the other leg of the three-way call is connected to the user's mobile device, causing the user's mobile device to ring or otherwise indicate the presence of an incoming call.

The user answers the call and the call leg to the agent and the call leg to the user are bridged, thereby connecting the user to the selected destination. The agent and user can now converse regarding the relevant subject matter.

FIG. 19GG illustrates, on the left hand-side, an example SMS message transmitted to the user's mobile device in response to the user calling a phone address assigned to the business, being connected with the communication system and requesting to receive access to the menu via an SMS message. The SMS message instructs the user to activate a 1-click call link included in the SMS message in order to access a phone menu associated with the business. On the right hand-side of FIG. 19GG is an example phone menu presented via the user's mobile device browser. The user can select a menu item and then select a "call me now" control. The user will then be connected to the appropriate person/service as similarly described above.

FIGS. 20A-G illustrate example user interfaces presented to a user and a service representative during a call session. After the user provides context information via a menu, form or otherwise (and/or context information is provided via the user communication device, such as GPS location information), the user initiates a call via a communication device, such as a wireless cellular phone, to a designated phone number or destination. For example, as similarly discussed above, the user may be contacting a service provider. While it appears to the user that the call is being placed from the user's communication device to the service provider, in this example the user is being called by the service provider. In other embodiments, the call may indeed be placed from the user's communication device.

Figure 20A:
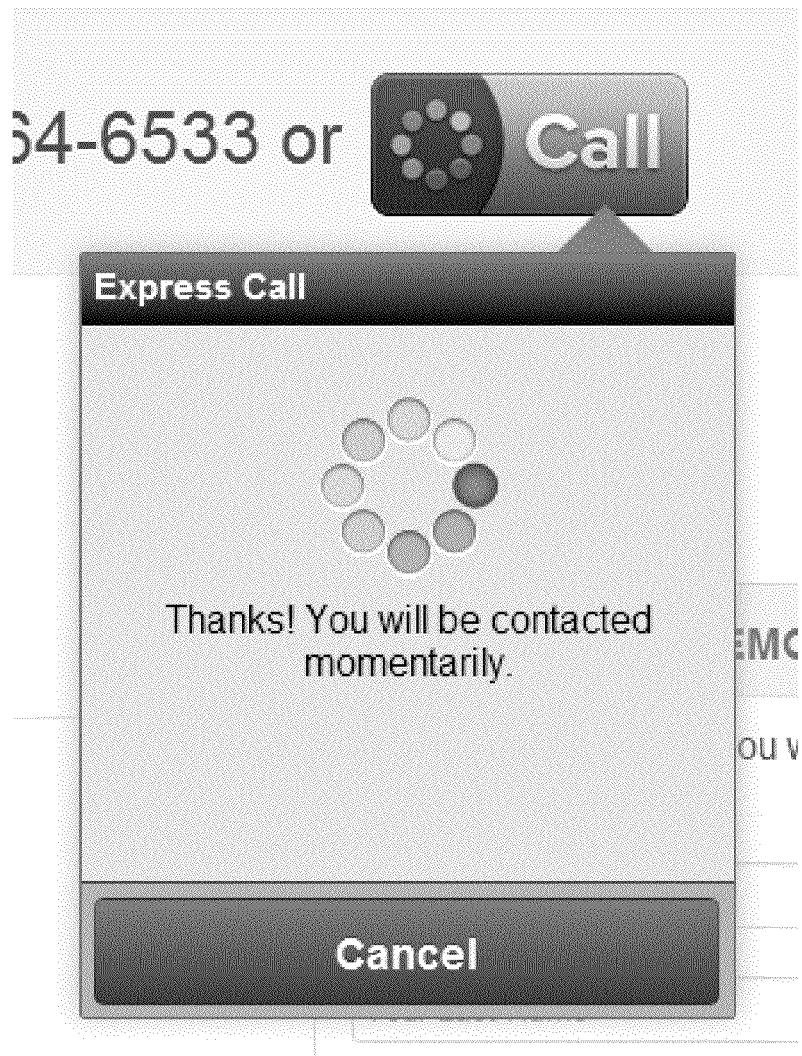
FIGS. 20A-G illustrate additional example user interfaces.
Figure 20B:
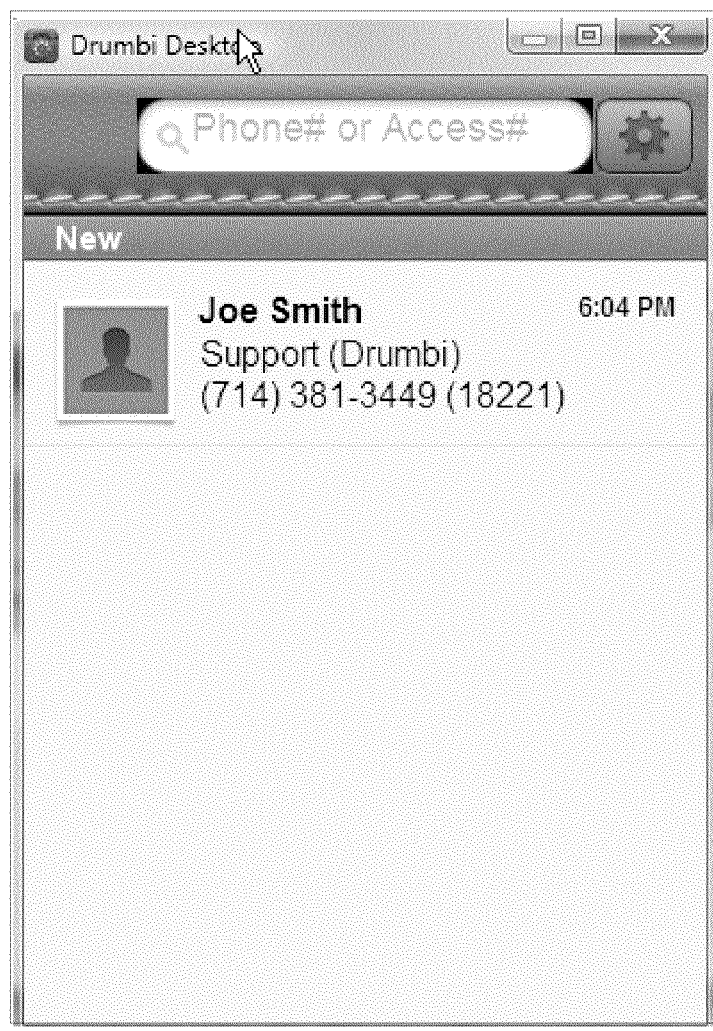
Figure 20C:
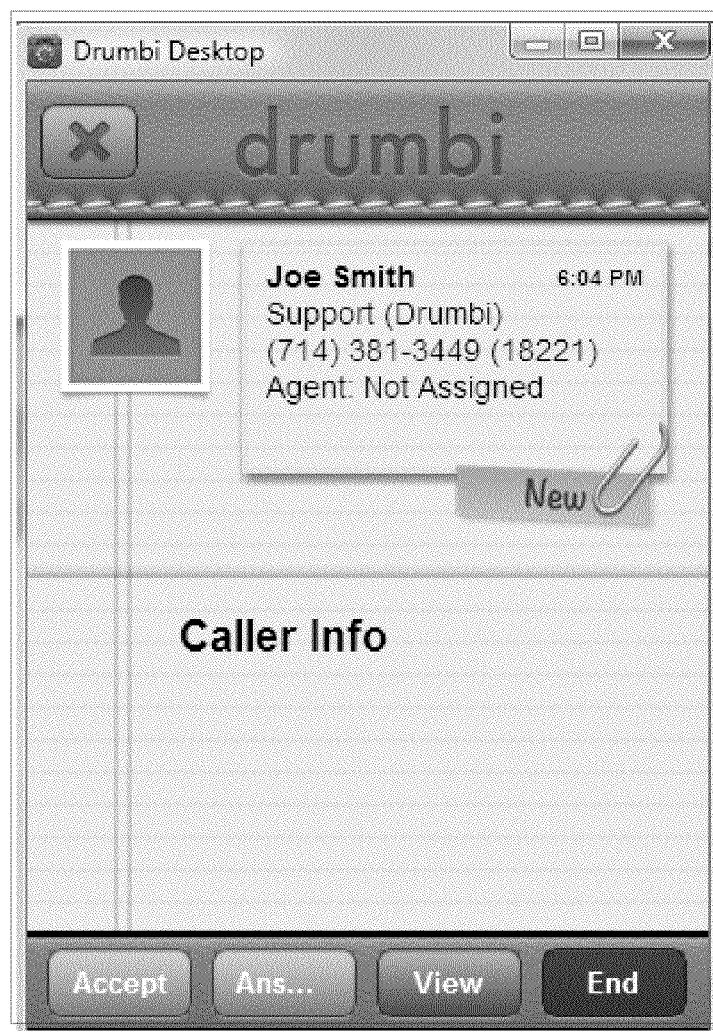
Figure 20D:
Figure 20E:
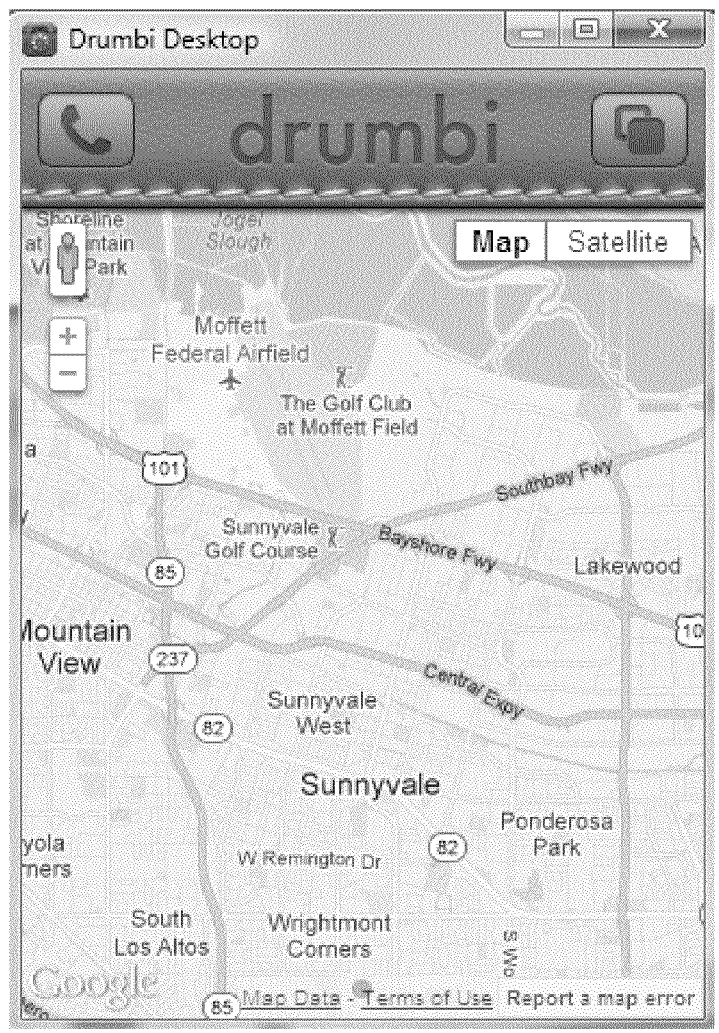
Figure 20F:
Figure 20G:

Referring to FIG. 20A, after the user has activated a phone application call control on the user's communication device, a notification is presented for display to the user informing the user that the user will be contacted momentarily (e.g., by a customer service agent). The call is then automatically routed to a customer service agent based on agent availability and/or the context information. FIG. 20B illustrates a user interface displayed on a terminal (e.g., a desktop terminal, laptop, tablet, wireless phone, etc.) of a service provider agent, providing the name, phone number, and title of the caller. FIG. 20C illustrates a user interface providing the user (caller) information and a notation that the user is a new caller and that an agent has not yet been assigned. Controls are provided via which the agent can accept the assignment to the caller, answer the call, view context information, etc. If the agent activates the answer control, the user interface is presented on the user communication device, indicating that the call has been established. Referring to the user interface illustrated in FIG. 20E, a map is presented to the agent on the agent terminal indicating the user location, local roads, and points of interest. The map may be accessed from a map site based on location information from the user communication device.

Thus, as disclosed herein, methods and systems are described that enable and coordinate data enhanced calls.

The systems and methods disclosed herein can be implemented in hardware, software, firmware, or a combination thereof. Software can include computer readable instructions stored in memory (e.g., non-transitory, tangible memory, such as solid state memory (e.g., ROM, EEPROM, FLASH, RAM), optical memory (e.g., a CD, DVD, Bluray disc, etc.), magnetic memory (e.g., a hard disc drive), etc., configured to implement the algorithms on a general purpose computer, special purpose processors, or combinations thereof. For example, one or more computing devices, such as a processor, may execute program instructions stored in computer readable memory to carry out processed disclosed herein. Hardware may include state machines, one or more general purpose computers, and/or one or more special purpose processors.

While certain embodiments may be illustrated or discussed as having certain example components, additional, fewer, or different components may be used. Further, with respect to the processes discussed herein, various states may be performed in a different order, not all states are required to be reached, and fewer, additional, or different states may be utilized.

While reference may be made to a phone app or application, the application may also reside other devices, such as an interactive television, a desktop computer, a laptop computer, a networked appliance, etc. While reference may be made to a phone app or browser, other applications may be used to view and navigate objects (e.g., Web pages or other documents). In addition, unless the context specifically indicates otherwise, notifications discussed above may be provided via voice, text, and/or graphically. For example, information may be provided to a user via a voice call and/or via text or images presented via an application or browser user interface (e.g., hosted on a user device, such as a mobile telecommunications device). It is understood, that while voice calls may be referred to herein, the voice calls may also include a video component and be in the form of a video call.

Conditional language, such as, among others, "can," "could," "might," or "may," unless specifically stated otherwise, or otherwise understood with the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features elements, and/or steps are included or are performed in any particular embodiment.

Any process descriptions, elements, or blocks in the flow diagrams described herein, and/or depicted in the attached figures, should be understood as potentially representing modules, segments, or portions of code which include one or more executable instructions for implementing specific logical functions or steps in the process. Implementations are included within the scope of the embodiments described herein which elements or functions which may be deleted, depending on the functionality involved, as would be understood by those skilled in the art.

Although this invention has been described in terms of certain preferred embodiments, other embodiments that are apparent to those of ordinary skill in the art, including embodiments that do not provide all of the features and advantages set forth herein, are also within the scope of this invention.

What is claimed is:

1. A method of processing calls and data, the method comprising:

providing a user interface for display on a communication terminal associated with a user, wherein the user interface includes:
  at least one menu item enabling the user to initiate a voice call with a specified entity;
  at least one menu item or form via which the user can provide contextual information relating to the voice call;
enabling contextual information provided by the user via the user interface to be transmitted to the specified entity prior to the voice call being established between the specified entity and the user in response to a user selection of the at least one menu item enabling the user to initiate the voice call with the specified entity;
receiving at a computer system a call request from the user, wherein the call request is transmitted to the computer system in response to the user selection of the at least one menu item enabling the user to initiate the voice call with the specified entity;
receiving at the computer system contextual information provided by the user via the application and establishing a data session; and
after the transmission of the contextual information to the specified entity, causing, at least in part, a voice session to be established, including the establishment of the voice call between the specified entity and the user;
answering a call from the user using an interactive voice response (IVR) system;
providing, via the IVR system, a menu selection via which the user can request that the user interface be made accessible to the user communication terminal via an SMS message and/or an MMS message; and
at least partly in response to receiving the user request via the IVR system, transmitting an SMS or MMS message to the user communication terminal providing access to the user interface.

2. The method as defined in claim 1, the method further comprising:
identifying a representative associated with the specified entity to route the voice call to based at least in part on the contextual information.

3. The method as defined in claim 1, the method further comprising:
receiving a first message in the form of short code service (SMS) message or multimedia messaging service (MMS) message from the user directed to a phone address associated with the specified entity; and
at least partly in response to receiving the first message, transmitting an SMS or MMS message to the user communication terminal providing access to the user interface.

4. The method as defined in claim 1, wherein the user interface is provided via an application downloaded to the user communication terminal.

5. The method as defined in claim 1, wherein at least a portion of the contextual information is provided for display on a terminal of the specified entity prior to the voice call between the specified entity and the user being established.

6. The method as defined in claim 1, wherein the contextual information is provided, at least in part, via the form presented on the communication terminal.

7. The method as defined in claim 1, wherein the contextual information is provided, at least in part, via a user selection of at least one menu item presented on the communication terminal.

8. The method as defined in claim 1, wherein the contextual information includes a file uploaded by the user.

9. The method as defined in claim 1, wherein the user interface enables the user to provide additional contextual information via the data session to the specified entity during the call.

10. The method as defined in claim 1, wherein the user interface enables the user to provide additional contextual information, via the data session, related to the call to the specified entity after the call.

11. The method as defined in claim 1, the method further comprising providing call status information in substantially real-time for display to the user via the user interface, wherein the call status information in selected from a group including: call hold and call being routed.

12. The method as defined in claim 1, the method further comprising persisting the data session over a plurality of voice calls.

13. The method as defined in claim 1, wherein the voice session is independent of the data session.

14. The method as defined in claim 1, wherein the voice call includes a video component.

15. The method as defined in claim 1, the method further comprising:
transmitting at least a portion of the contextual information for display on a terminal of a second specified entity; and
facilitating the joining of the second specified entity in the voice call between the user and the specified entity.

16. The method as defined in claim 1, the method further comprising authenticating, by the computer system, the user based at least in part on at least a portion of the contextual information prior to establishing the voice call.

17. The method as defined in claim 1, wherein the contextual information includes at least non-callerID information.

18. The method as defined in claim 1, wherein the contextual information includes a voice call importance indication specified by the user.

19. The method as defined in claim 1, wherein the contextual information includes insurance-related information.

20. The method as defined in claim 1, the method further comprising dynamically adjusting at least a first menu presented on the user communication terminal based at least in part on prior user interactions with the specified entity.

21. The method as defined in claim 1, the method further comprising dynamically adjusting at least a first menu presented on the user communication terminal based at least in part on geo-location information related to the user's physical location, wherein the first menu includes at least one menu item that enables a user to communicate with the specified entity via a data channel.

22. The method as defined in claim 1, the method further comprising inferring that the user is a customer of at least one service provider based at least in part on information accessed from a social networking site.

23. The method as defined in claim 1, wherein the at least one menu item includes at least a link.

24. The method as defined in claim 1, for a second user, determining whether or not to cause a second user interface, configured to enable the second user to provide context for a call between the second user and the specified entity, to be displayed to the second user based at least in part on historical contextual information for the second user.

25. A method of processing calls and data, the method comprising:
providing a user interface for display on a communication terminal associated with a user, wherein the user interface includes:
at least one menu item enabling the user to initiate a voice call with a specified entity;
at least one menu item or form via which the user can provide contextual information relating to the voice call;
enabling contextual information provided by the user via the user interface to be transmitted to the specified entity prior to the voice call being established between the specified entity and the user in response to a user selection of the at least one menu item enabling the user to initiate the voice call with the specified entity;
receiving at a computer system a call request from the user, wherein the call request is transmitted to the computer system in response to the user selection of the at least one menu item enabling the user to initiate the voice call with the specified entity;
receiving at the computer system contextual information provided by the user via the application and establishing a data session;
after the transmission of the contextual information to the specified entity, causing, at least in part, a voice session to be established, including the establishment of the voice call between the specified entity and the user; and
receiving location information of the communication terminal prior to the establishment of the call and providing at least a portion of the location information for display on at least one terminal associated with the specified entity.

26. A method of processing calls and data, the method comprising:
providing a user interface for display on a communication terminal associated with a user, wherein the user interface includes:
at least one menu item enabling the user to initiate a voice call with a specified entity;
at least one menu item or form via which the user can provide contextual information relating to the voice call;
enabling contextual information provided by the user via the user interface to be transmitted to the specified entity prior to the voice call being established between the specified entity and the user in response to a user selection of the at least one menu item enabling the user to initiate the voice call with the specified entity;
receiving at a computer system a call request from the user, wherein the call request is transmitted to the computer system in response to the user selection of the at least one menu item enabling the user to initiate the voice call with the specified entity;
receiving at the computer system contextual information provided by the user via the application and establishing a data session;
after the transmission of the contextual information to the specified entity, causing, at least in part, a voice session to be established, including the establishment of the voice call between the specified entity and the user; and dynamically adjusting at least a first menu presented on the user communication terminal based at least in part on whether the user has been authenticated as a customer of the specified entity, wherein the first menu includes at least one menu item that enables a user to communicate with the specified entity via a data channel.

27. A method of processing calls and data, the method comprising:
   providing a user interface for display on a communication terminal associated with a user, wherein the user interface includes:
      at least one menu item enabling the user to initiate a voice call with a specified entity;
      at least one menu item or form via which the user can provide contextual information relating to the voice call;
   enabling contextual information provided by the user via the user interface to be transmitted to the specified entity prior to the voice call being established between the specified entity and the user in response to a user selection of the at least one menu item enabling the user to initiate the voice call with the specified entity;
   receiving at a computer system a call request from the user, wherein the call request is transmitted to the computer system in response to the user selection of the at least one menu item enabling the user to initiate the voice call with the specified entity;
   receiving at the computer system contextual information provided by the user via the application and establishing a data session;
   after the transmission of the contextual information to the specified entity, causing, at least in part, a voice session to be established, including the establishment of the voice call between the specified entity and the user; and
   dynamically adjusting at least a first menu on the user communication terminal based information obtained from a social networking site of which the user is a participant, wherein the first menu includes at least one menu item that enables a user to communicate with at least one specified entity via a data channel.

28. A method of processing calls and data, the method comprising:
   providing a user interface for display on a communication terminal associated with a user, wherein the user interface includes:
      at least one menu item enabling the user to initiate a voice call with a specified entity;
      at least one menu item or form via which the user can provide contextual information relating to the voice call;
   enabling contextual information provided by the user via the user interface to be transmitted to the specified entity prior to the voice call being established between the specified entity and the user in response to a user selection of the at least one menu item enabling the user to initiate the voice call with the specified entity;
   receiving at a computer system a call request from the user, wherein the call request is transmitted to the computer system in response to the user selection of the at least one menu item enabling the user to initiate the voice call with the specified entity;
   receiving at the computer system contextual information provided by the user via the application and establishing a data session;
   after the transmission of the contextual information to the specified entity, causing, at least in part, a voice session to be established, including the establishment of the voice call between the specified entity and the user; and
   dynamically predicting a need of the user based at least in part on weather data, traffic data, time, user location, user movement data, and/or identified popular topics of other users, and modifying at least a first menu based at least in part on the predicted need.

29. A call and data processing system, comprising:
   a computing system;
   non-transitory memory storing instructions that when executed by the computing system cause the computing system to perform operations comprising:
      providing a user interface for display on a communication terminal associated with a user, wherein the user interface includes:
         at least one menu item enabling the user to initiate a voice call with a specified entity;
         at least one menu item or form via which the user can provide contextual information relating to the voice call;
      enabling contextual information provided by the user via the user interface to be transmitted to the specified entity prior to the voice call being established between the specified entity and the user in response to a user selection of the at least one menu item enabling the user to initiate the voice call with the specified entity;
      receiving at a computer system, a call request from the user, wherein the call request is transmitted to the computer system in response to the user selection of the at least one menu item enabling the user to initiate the voice call with the specified entity;
      receiving at the computer system contextual information provided by the user via the user interface and establishing a data session; and
      after the transmission of the contextual information to the specified entity, causing, at least in part, a voice session to be established, including the establishment of the voice call between the specified entity and the user;
   answering a call from the user using an interactive voice response (IVR) system;
   providing, via the IVR system, a menu selection via which the user can request that the user interface be made accessible to the user communication terminal via an SMS message and/or an MMS message; and
   at least partly in response to receiving the user request via the IVR system, transmitting an SMS or MMS message to the user communication terminal providing access to the user interface.

30. The system as defined in claim 29, the operations further comprising:
   receiving a first message in the form of short code service (SMS) message or multimedia messaging service (MMS) message from the user directed to a phone address associated with the specified entity; and
   at least partly in response to receiving the first message transmitting an SMS or MMS message to the user communication terminal providing access to the user interface.

31. The system as defined in claim 29, wherein the user interface is provided via an application downloaded to the user communication terminal.

* * * * *